United States Patent
Truscott et al.

(10) Patent No.: US 12,536,826 B2
(45) Date of Patent: Jan. 27, 2026

(54) COMPUTERIZED RECOGNITION OF TABULAR DATA FROM AN IMAGE

(71) Applicant: Automation Anywhere, Inc., San Jose, CA (US)

(72) Inventors: Jesse Truscott, Petaluma, CA (US); Harshil Lodhiya, Vadodara, CA (US); Virinchipuram Anand, San Ramon, CA (US)

(73) Assignee: Automation Anywhere, Inc., San Jose, CA (US)

( * ) Notice: Subject to any disclaimer, the term of this patent is extended or adjusted under 35 U.S.C. 154(b) by 433 days.

(21) Appl. No.: 18/082,567

(22) Filed: Dec. 15, 2022

(65) Prior Publication Data

US 2023/0419705 A1    Dec. 28, 2023

Related U.S. Application Data

(60) Provisional application No. 63/355,091, filed on Jun. 23, 2022.

(51) Int. Cl.
*G06V 30/412* (2022.01)
*G06V 10/26* (2022.01)
*G06V 30/413* (2022.01)
*G06F 3/04847* (2022.01)

(52) U.S. Cl.
CPC ............ *G06V 30/412* (2022.01); *G06V 10/26* (2022.01); *G06V 30/413* (2022.01); *G06F 3/04847* (2013.01); *G06V 2201/02* (2022.01)

(58) Field of Classification Search
CPC .......................................... G06T 2207/10028
See application file for complete search history.

(56) References Cited

U.S. PATENT DOCUMENTS

| | | | |
|---|---|---|---|
| 5,949,999 | A | 9/1999 | Song et al. |
| 5,983,001 | A | 11/1999 | Boughner et al. |
| 6,133,917 | A | 10/2000 | Feigner et al. |
| 6,226,407 | B1 | 5/2001 | Zabih et al. |
| 6,389,592 | B1 | 5/2002 | Ayres et al. |
| 6,427,234 | B1 | 7/2002 | Chambers et al. |
| 6,473,794 | B1 | 10/2002 | Guheen et al. |
| 6,496,979 | B1 | 12/2002 | Chen et al. |
| 6,640,244 | B1 | 10/2003 | Bowman-Amuah |
| 6,704,873 | B1 | 3/2004 | Underwood |
| 6,898,764 | B2 | 5/2005 | Kemp |
| 6,954,747 | B1 | 10/2005 | Wang et al. |
| 6,957,186 | B1 | 10/2005 | Guheen et al. |
| 7,091,898 | B2 | 8/2006 | Arling et al. |

(Continued)

OTHER PUBLICATIONS

Al Sallami, Load Balancing in Green Cloud Computation, Proceedings of the World Congress on Engineering 2013 vol. II, WCE 2013, 2013, pp. 1-5 (Year: 2013).

(Continued)

*Primary Examiner* — Di Xiao

(57) ABSTRACT

Embodiments disclosed herein concern improved techniques for recognition of tabularized data within an image and construction of a computer-readable electronic table representing the recognized tabularized data. The image can be a screen image produced by a software application program operating on a computing device. The tabular data, such as pertaining to a table, can be recognized by recognizing rows, columns, text, controls and lines.

30 Claims, 31 Drawing Sheets

(56) References Cited

U.S. PATENT DOCUMENTS

| | | |
|---|---|---|
| 7,246,128 B2 | 7/2007 | Jordahl |
| 7,398,469 B2 | 7/2008 | Kisamore et al. |
| 7,441,007 B1 | 10/2008 | Kirkpatrick et al. |
| 7,533,096 B2 | 5/2009 | Rice et al. |
| 7,568,109 B2 | 7/2009 | Powell et al. |
| 7,571,427 B2 | 8/2009 | Wang et al. |
| 7,765,525 B1 | 7/2010 | Davidson et al. |
| 7,805,317 B2 | 9/2010 | Khan et al. |
| 7,805,710 B2 | 9/2010 | North |
| 7,810,070 B2 | 10/2010 | Nasuti et al. |
| 7,846,023 B2 | 12/2010 | Evans et al. |
| 8,028,269 B2 | 9/2011 | Bhatia et al. |
| 8,056,092 B2 | 11/2011 | Allen et al. |
| 8,095,910 B2 | 1/2012 | Nathan et al. |
| 8,132,156 B2 | 3/2012 | Malcolm |
| 8,209,738 B2 | 6/2012 | Nicol et al. |
| 8,234,622 B2 | 7/2012 | Meijer et al. |
| 8,245,215 B2 | 8/2012 | Extra |
| 8,352,464 B2 | 1/2013 | Folev |
| 8,396,890 B2 | 3/2013 | Lim |
| 8,438,558 B1 | 5/2013 | Adams |
| 8,443,291 B2 | 5/2013 | Ku et al. |
| 8,464,240 B2 | 6/2013 | Fritsch et al. |
| 8,498,473 B2 | 7/2013 | Chong et al. |
| 8,504,803 B2 | 8/2013 | Shukla |
| 8,631,458 B1 | 1/2014 | Banerjee |
| 8,682,083 B2 | 3/2014 | Kumar et al. |
| 8,713,003 B2 | 4/2014 | Fotev |
| 8,769,482 B2 | 7/2014 | Batey et al. |
| 8,819,241 B1 | 8/2014 | Washburn |
| 8,832,048 B2 | 9/2014 | Lim |
| 8,874,685 B1 | 10/2014 | Hollis et al. |
| 8,943,493 B2 | 1/2015 | Schneider |
| 8,965,905 B2 | 2/2015 | Ashmore et al. |
| 9,032,314 B2 | 5/2015 | Mital et al. |
| 9,104,294 B2 | 8/2015 | Forstall et al. |
| 9,213,625 B1 | 12/2015 | Schrage |
| 9,278,284 B2 | 3/2016 | Ruppert et al. |
| 9,444,844 B2 | 9/2016 | Edery et al. |
| 9,462,042 B2 | 10/2016 | Shukla et al. |
| 9,571,332 B2 | 2/2017 | Subramaniam et al. |
| 9,600,519 B2 | 3/2017 | Schoning et al. |
| 9,621,584 B1 | 4/2017 | Schmidt et al. |
| 9,946,233 B2 | 4/2018 | Brun et al. |
| 10,043,255 B1 | 8/2018 | Pathapati et al. |
| 10,282,280 B1 | 5/2019 | Gouskova |
| 10,706,218 B2 | 7/2020 | Milward et al. |
| 11,182,178 B1 | 11/2021 | Singh et al. |
| 2003/0033590 A1 | 2/2003 | Leherbauer |
| 2003/0101245 A1 | 5/2003 | Srinivasan et al. |
| 2003/0159089 A1 | 8/2003 | DiJoseph |
| 2004/0083472 A1 | 4/2004 | Rao et al. |
| 2004/0153649 A1 | 8/2004 | Rhoads |
| 2004/0172526 A1 | 9/2004 | Tann et al. |
| 2004/0210885 A1 | 10/2004 | Wang et al. |
| 2004/0243994 A1 | 12/2004 | Nasu |
| 2005/0188357 A1 | 8/2005 | Derks et al. |
| 2005/0204343 A1 | 9/2005 | Kisamore et al. |
| 2005/0257214 A1 | 11/2005 | Moshir et al. |
| 2006/0095276 A1 | 5/2006 | Axelrod et al. |
| 2006/0150188 A1 | 7/2006 | Roman et al. |
| 2007/0101291 A1 | 5/2007 | Forstall et al. |
| 2007/0112574 A1 | 5/2007 | Greene |
| 2007/0156677 A1 | 7/2007 | Szabo |
| 2008/0005086 A1 | 1/2008 | Moore |
| 2008/0027769 A1 | 1/2008 | Eder |
| 2008/0028392 A1 | 1/2008 | Chen et al. |
| 2008/0209392 A1 | 8/2008 | Able et al. |
| 2008/0222454 A1 | 9/2008 | Kelso |
| 2008/0263024 A1 | 10/2008 | Landschaft et al. |
| 2009/0037509 A1 | 2/2009 | Parekh et al. |
| 2009/0103769 A1 | 4/2009 | Milov et al. |
| 2009/0116071 A1 | 5/2009 | Mantell |
| 2009/0172814 A1 | 7/2009 | Khosravi et al. |
| 2009/0199160 A1 | 8/2009 | Vaitheeswaran et al. |
| 2009/0217309 A1 | 8/2009 | Grechanik et al. |
| 2009/0249297 A1 | 10/2009 | Doshi et al. |
| 2009/0313229 A1 | 12/2009 | Fellenstein et al. |
| 2009/0320002 A1 | 12/2009 | Peri-Glass et al. |
| 2010/0023602 A1 | 1/2010 | Marlone |
| 2010/0023933 A1 | 1/2010 | Bryant et al. |
| 2010/0100605 A1 | 4/2010 | Allen et al. |
| 2010/0106671 A1 | 4/2010 | Li et al. |
| 2010/0138015 A1 | 6/2010 | Colombo et al. |
| 2010/0235433 A1 | 9/2010 | Ansari et al. |
| 2010/0251163 A1 | 9/2010 | Keable |
| 2011/0022578 A1 | 1/2011 | Folev |
| 2011/0145807 A1 | 6/2011 | Molinie et al. |
| 2011/0197121 A1 | 8/2011 | Kletter |
| 2011/0276568 A1 | 11/2011 | Fotev |
| 2011/0276946 A1 | 11/2011 | Pletter |
| 2011/0302570 A1 | 12/2011 | Kurimilla et al. |
| 2012/0011458 A1 | 1/2012 | Xia et al. |
| 2012/0042281 A1 | 2/2012 | Green |
| 2012/0124062 A1 | 5/2012 | Macbeth et al. |
| 2012/0131456 A1 | 5/2012 | Lin et al. |
| 2012/0324333 A1 | 12/2012 | Lehavi |
| 2012/0330940 A1 | 12/2012 | Caire et al. |
| 2013/0173648 A1 | 7/2013 | Tan et al. |
| 2013/0290318 A1 | 10/2013 | Shapira et al. |
| 2014/0036290 A1 | 2/2014 | Miyagawa |
| 2014/0045484 A1 | 2/2014 | Kim et al. |
| 2014/0181705 A1 | 6/2014 | Hey et al. |
| 2015/0082280 A1 | 3/2015 | Betak et al. |
| 2015/0121179 A1* | 4/2015 | Saund ............... G06F 3/04883 715/202 |
| 2015/0310268 A1 | 10/2015 | He |
| 2015/0347284 A1 | 12/2015 | Hey et al. |
| 2016/0019049 A1 | 1/2016 | Kakhandiki et al. |
| 2016/0034441 A1 | 2/2016 | Nguyen et al. |
| 2016/0078368 A1 | 3/2016 | Kakhandiki et al. |
| 2018/0113781 A1 | 4/2018 | Kim |
| 2018/0275835 A1 | 9/2018 | Prag |
| 2019/0126463 A1 | 5/2019 | Purushothaman |
| 2019/0141596 A1 | 5/2019 | Gay |
| 2019/0188462 A1 | 6/2019 | Nishida |
| 2019/0310868 A1* | 10/2019 | Vaindiner ............ G06V 30/416 |
| 2019/0317803 A1 | 10/2019 | Maheshwari |
| 2021/0073326 A1* | 3/2021 | Aggarwal ............ G06F 40/103 |
| 2021/0366099 A1* | 11/2021 | Liao ...................... G06F 40/216 |
| 2022/0318224 A1* | 10/2022 | Thompson ............ G06V 10/70 |
| 2022/0335240 A1* | 10/2022 | Smock .................. G06N 3/045 |

OTHER PUBLICATIONS

B.P. Kasper "Remote: A Means of Remotely Controlling and Storing Data from a HAL Quadrupole Gass Analyzer Using an IBM-PC Compatible Computer", Nov. 15, 1995, Space and Environment Technology Center.

Bergen et al., RPC automation: making legacy code releant, May 2013, 6 pages.

Hu et al., Automating GUI testing for Android applications, May 2011, 7 pages.

Konstantinou et al., An architecture for virtual solution composition and deployment in infrastructure clouds, 9 pages (Year: 2009).

Nyulas et al., An Ontology-Driven Framework for Deploying JADE Agent Systems, 5 pages (Year: 2006).

Tom Yeh, Tsung-Hsiang Chang, and Robert C. Miller, Sikuli: Using GUI Screenshots for Search and Automation, Oct. 4-7, 2009, 10 pages.

Yu et al., Deplying and managing Web services: issues, solutions, and directions, 36 pages (Year: 2008).

Zhifang et al., Test automation on moble device, May 2010, 7 pages.

Non-Final Office Action for U.S. Appl. No. 17/230,492, mailed Oct. 14, 2022.

Notice of Allowance for U.S. Appl. No. 16/398,532, mailed Oct. 23, 2022.

Non-Final Office Action for U.S. Appl. No. 16/876,530, mailed Sep. 29, 2020.

Final Office Action for U.S. Appl. No. 16/876,530, mailed Apr. 13, 2021.

(56) References Cited

OTHER PUBLICATIONS

Notice of Allowance for U.S. Appl. No. 16/876,530, mailed Jul. 22, 2021.

* cited by examiner

Display Data Record for IDoc

IDoc Display

| | | |
|---|---|---|
| IDoc number | 291014 | |
| Segment type | E1EDKA1 | IDoc: Document Header Partner Information |
| Number | 3 | |
| No. higher segment | 0 | Hierarchy level  2 |

| Field name | Field contents | Short Description |
|---|---|---|
| PARVW | AG : Sold-to party | Partner function (e.g. sold-t |
| PARTN | 0000000015 | Partner number |
| LIFNR | EXT_CUSTOMER | Vendor number at customer |
| NAME1 | Budd Tugly | Name 1 |
| STRAS | 79 Peacock Lane | Street and house number 1 |
| ORT01 | Williamsburg | City |
| PSTLZ | 23185 | Postal code |
| LAND1 | US | Country Key |
| SPRAS | E | Language key |
| REGIO | VA | Region |
| SPRAS_ISO | EN | Language according to ISO |

Entry  1 /  11

| ☐ | Header 1 | Column 2 | Col Three | |
|---|---|---|---|---|
| ☐ | Cell A | Cell B | Cell C | [ Edit ] |
| ☐ | Cell D | Cell E | Cell F | [ Edit ] |
| ☐ | Cell G | Cell H | Cell I | [ Edit ] |
| ☐ | CJ | Cell K | Cell J | [ Edit ] |
| ☐ | CL | Cell M | Cell N | [ Edit ] |

[ OK ] [ Cancel ]

FIG. 10

| ☐ | Header 1 | Column 2 | Col Three | |
|---|---|---|---|---|
| ☐ Cell A | Cell B | Cell C | Edit |
| ☐ Cell D | Cell E | Cell F | Edit |
| ☐ Cell G | Cell H | Cell I | Edit |
| ☐ CJ | Cell K | Cell J | Edit |
| ☐ CL | Cell M | Cell N | Edit |

OK | Cancel

Text!

| ☐ | Header 1 | Column 2 | Col Three | |
|---|---|---|---|---|
| ☐ | Cell A | Cell B | Cell C | Edit |
| ☐ | Cell D | Cell E | Cell F | Edit |
| ☐ | Cell G | Cell H | Cell I | Edit |
| ☐ | CJ | Cell K | Cell J | Edit |
| ☐ | CL | Cell M | Cell N | Edit |

OK  Cancel

FIG. 13A

Text!

| ☐ | Header 1 | Column 2 | Col Three | |
|---|---|---|---|---|
| ☐ | Cell A | Cell B | Cell C | Edit |
| ☐ | Cell D | Cell E | Cell F | Edit |
| ☐ | Cell G | Cell H | Cell I | Edit |
| ☐ | CJ | Cell K | Cell J | Edit |
| ☐ | CL | Cell M | Cell N | Edit |

[ OK ] [ Cancel ]

FIG. 13B

| | Header 1 | Column 2 | Col Three | |
|---|---|---|---|---|
| ☐ | Cell A | Cell B | Cell C | Edit |
| ☐ | Cell D | Cell E | Cell F | Edit |
| ☐ | Cell G | Cell H | Cell I | Edit |
| ☐ | CJ | Cell K | Cell J | Edit |
| ☐ | CL | Cell M | Cell N | Edit |

Text!

OK  Cancel

FIG. 14A

| | Header 1 | Column 2 | Col Three | |
|---|---|---|---|---|
| ☐ | Cell A | Cell B | Cell C | Edit |
| ☐ | Cell D | Cell E | Cell F | Edit |
| ☐ | Cell G | Cell H | Cell I | Edit |
| ☐ | CJ | Cell K | Cell J | Edit |
| ☐ | CL | Cell M | Cell N | Edit |

Text!

OK  Cancel

FIG. 15B

FIG. 15C ns and rows for the table being recognized can

COMPUTERIZED RECOGNITION OF TABULAR DATA FROM AN IMAGE

CROSS-REFERENCE TO RELATED APPLICATION

This application claims priority to U.S. Provisional Patent Application No. 63/355,091, filed Jun. 23, 2022, and entitled "COMPUTERIZED RECOGNITION OF TABULAR DATA FROM AN IMAGE," which is hereby incorporated by reference herein.

BACKGROUND OF THE INVENTION

Robotic Process Automation (RPA) systems enable automation of repetitive and manually intensive computer-based tasks. In an RPA system, computer software, namely a software robot (often referred to as a "bot"), may mimic the actions of a human being in order to perform various computer-based tasks. For instance, an RPA system can be used to interact with one or more software applications through user interfaces, as a human being would do. Therefore, RPA systems typically do not need to be integrated with existing software applications at a programming level, thereby eliminating the difficulties inherent to integration. Advantageously, RPA systems permit the automation of application level repetitive tasks via software robots that are coded to repeatedly and accurately perform the repetitive task.

Unfortunately, however, since RPA systems are typically not integrated with existing software applications, there are often difficulties in acquiring "tabular" data from screens produced and displayed by the existing software applications.

Automating "tabular" data using visual screenshots of a screen produced and displayed by an application operating on a computing device, instead of direct object introspection via the computing device, is often the only choice available to RPA systems, which often operate in virtual and remote desktop environments. However, detection of "tabular" data, such as tables, from screen images is a very complicated task. The variety of table renderings by numerous different applications, all with different characteristics, features and controls, is virtually unlimited. Tables can be as simple as symmetrically arranged texts in equally sized cells, to complex combinations of controls like, check boxes, radio buttons, images, combo boxes, text boxes, tree views, etc., with asymmetrically-sized cell structures. Tables can be represented on just a single page or on multiple pages with columns laid outside visible screen areas and accessed with vertical and horizontal scrollbars.

In the case of screen images (e.g., screenshots) that are to be accessed and processed by one or more software applications being used by software robots, the tables, including their structure and content, can be analyzed from the screen images. The screen images can contain text which can be obtained by Optical Character Recognition (OCR) processing. While OCR processing of documents can recognize text contained therein, such processing is not well suited for recognizing a table's content and its associated table structure.

Machine learning algorithms, such as Convolutional Neural Networks (CNN), have been trained to detect tabular structure within images. However, conventional techniques do not adequately locate content and/or controls for each cell of a table, and particularly not in relation to the tabular structure. The ability to recognize the tabular structure, such as number of columns, number of rows, headers, etc. is conventionally a difficult task.

Tables can be presented within images on screen displays in a wide variety of different ways. This makes recognition of the tabular structure complicated. FIGS. 1A-1G illustrates some examples of different appearances for tables within images on screen displays.

FIG. 1A is a screenshot of an exemplary User Interface (UI) captured during a recording process. The UI includes a tabular structure therein. The tabular structure is, for example, a table. The tabular structure includes controls like checkboxes, dropdown handles, and link buttons in columns and headers. Also, in this example, the table does not have separators between cells horizontally, and the width of columns are also dynamic based on content. The composition of tables can also change drastically based on content and external factors, e.g., external search criteria, column sorting, pagination, etc.

FIG. 1B is a screenshot similar to FIG. 1A. However, the tabular structure in FIG. 1B has been reduced by the number of rows and change in position of rows due to change in search criteria. This also represents a change in composition of supportive controls to navigate pages, i.e., vertical scrollbar, is no longer present.

FIG. 1C is a screenshot similar to FIG. 1B. However, FIG. 1C represents the change in positioning of data when application size or screen size changes within a virtual environment. This also leads to changes in supporting pagination controls, e.g., removal of the horizontal scrollbar, and addition of new columns which were invisible in FIG. 1B due to size constraints.

FIG. 1D is a screenshot similar to FIG. 1C. However, FIG. 1D depicts a minimalistic tabular format with a single row and with some empty cells.

FIG. 1E is a screenshot depicting a scenario of a table with a different set of characteristics as compared to FIG. 1A, wherein the table is defined with a table boundary line, navigational controls within table boundary, and the cells are clearly separated.

FIG. 1F is a screenshot depicting a table which is a composition of text boxes and which is not clearly defined by table boundaries, and with overlapping windows.

FIG. 1G is a screenshot depicting a table with wide column widths and one or more empty columns.

Therefore, there is a need for improved approaches to recognize and extract data from tables provided within screen images. When used with RPA systems, the improved approaches are needed to accurately understand the content of screen images so that software robots can operate on data within tables with increased reliability and flexibility.

SUMMARY

Embodiments disclosed herein concern improved techniques for recognition of tabularized data within an image and construction of a computer-readable electronic table representing the recognized tabularized data. The image can be a screen image produced by a software application program operating on a computing device. The tabular data, such as pertaining to a table, can be recognized by recognizing rows, columns, text, controls and lines.

Image processing to extract object data pertain to various different objects that reside within the image. The object data can for example, pertain to text objects, control objects, lines or patterns that can be recognized within the image. Then, columns and rows for the table being recognized can be determined based on the extracted object data. Next, cells for the table can be determined from the determined columns and rows for the table. Content for the cells of the table can be extracted from the image and used to construct the computer-readable electronic table that represents the table in the image.

Advantageously, the improved techniques can enable automated extraction of table data from an image on a computer screen, and creation of a computer readable data structure capable of storing the extracted table data. In one embodiment, the improved techniques can be used in an RPA system such that tables displayed on a display screen by a computing device can be automatically recognized and extracted, and thereafter available for subsequent automatic operations using the RPA system.

The invention can be implemented in numerous ways, including as a method, system, device, or apparatus (including computer readable medium and graphical user interface). Several exemplary embodiments of the invention are discussed below.

As a computer-implemented method for constructing an electronic table representing a table contained within an image, one embodiment can, for example, include at least the operations of: receiving an image including the table, the image being a screen image from a display associated with a computing device; processing the image to capture object data from the image, the object data pertaining to objects within the image, the objects within the image include at least control objects, text objects and line objects, wherein the object data for a control object includes control object data, the object data for a text object includes text object data, and the object data for a line object includes line object data; determining columns and rows for the table contained within the image based on at least a portion of the captured object data from the image; identifying content for cells within the table contained within the image based on at least a portion of the captured object data from the image; and storing electronic data to a table data structure such that the electronic data is stored to one or more of the cells of the table data structure, the electronic data being stored to the table data structure being determined at least in part by the captured object data from the image.

As a non-transitory computer readable medium including at least computer program code stored therein for constructing an electronic table representing a table contained within an image, one embodiment can, for example, include at least: computer program code for receiving an image including the table, the image being a screen image from a display associated with a computing device; computer program code for processing the image to capture object data from the image, the object data pertaining to objects within the image, the objects within the image include at least control objects, text objects and line objects, wherein the object data for a control object includes control object data, the object data for a text object includes text object data, and the object data for a line object includes line object data; computer program code for determining columns and rows for the table contained within the image based on at least a portion of the captured object data from the image; computer program code for identifying content for cells within the table contained within the image based on at least a portion of the captured object data from the image; and computer program code for storing electronic data to the electronic table such that the electronic data is stored to one or more of the cells of the electronic table, the electronic data being stored to the table data structure being determined at least in part by the captured object data from the image.

As a robotic process automation system, one embodiment can, for example, include at least: a data store configured to store a plurality of software robots, the software robots providing automated interaction with one or more software programs operating on one or more computing devices; and a table extraction and construction manager configured to (i) receive an image including a table; (ii) process the image to capture object data from the image; (iii) determine columns and rows for the table contained within the image based on at least a portion of the captured object data from the image; (iv) identify content for cells within the table contained within the image based on at least a portion of the captured object data from the image; and (v) store electronic data descriptive of the table to the data store, the descriptive data including at least data identifying (i) column and row boundaries for the table, which define cells of the table, and (ii) data identifying content for the cells of the table.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which:

FIGS. 1A-1G illustrates some examples of different appearances for tables within images on screen displays.

FIG. 10 illustrates an exemplary image of a table that can be processed.

FIG. 11 illustrates recognition of control objects with respect to the table illustrated in FIG. 10.

FIG. 12 illustrates recognition of text objects with respect to the table illustrated in FIG. 10.

FIG. 13A illustrates determined horizontal lines with respect to the table illustrated in FIG. 10.

FIG. 13B illustrates determined vertical lines with respect to the table illustrated in FIG. 10.

FIG. 14A illustrates a binary mask pertaining to determined horizontal text regions with respect to the table illustrated in FIG. 10.

FIG. 15B illustrates an exemplary second processed image mask for identifying table header regions with respect to the table illustrated in FIG. 10.

FIG. 15C illustrates an exemplary third processed image mask locating table candidates.

DETAILED DESCRIPTION OF CERTAIN EMBODIMENTS

Figure 1A:
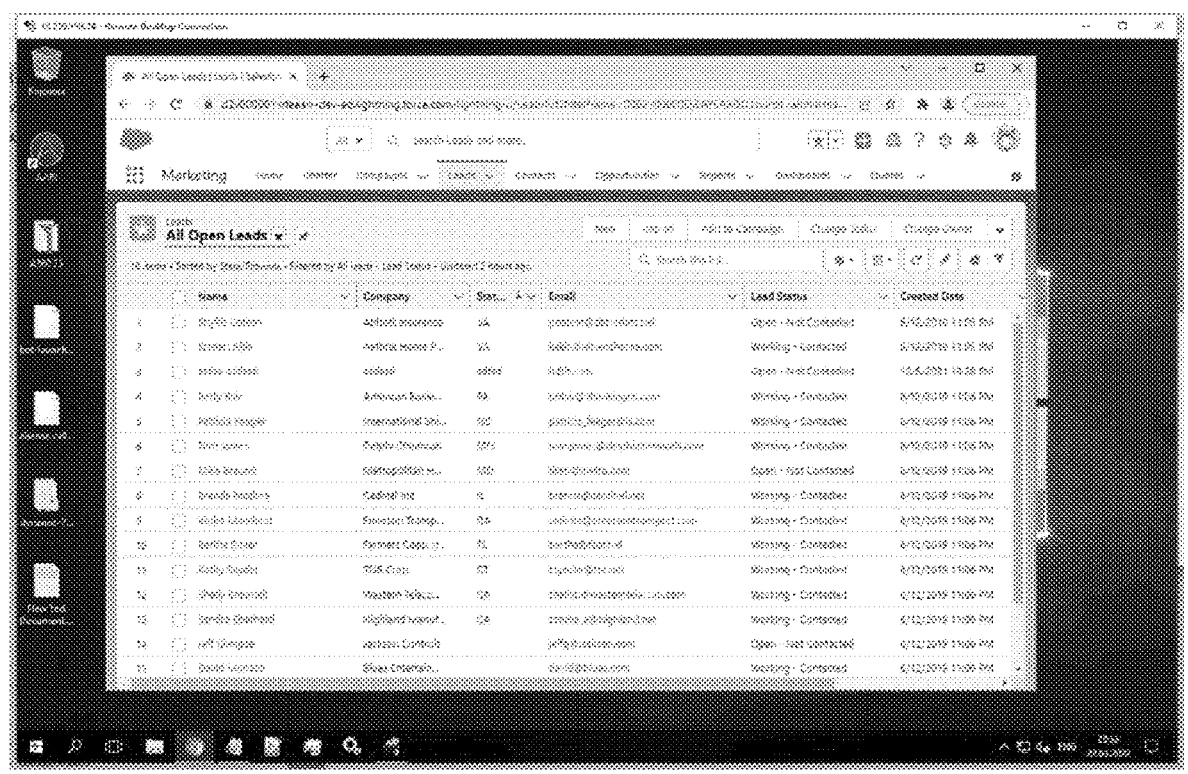
Figure 1B:
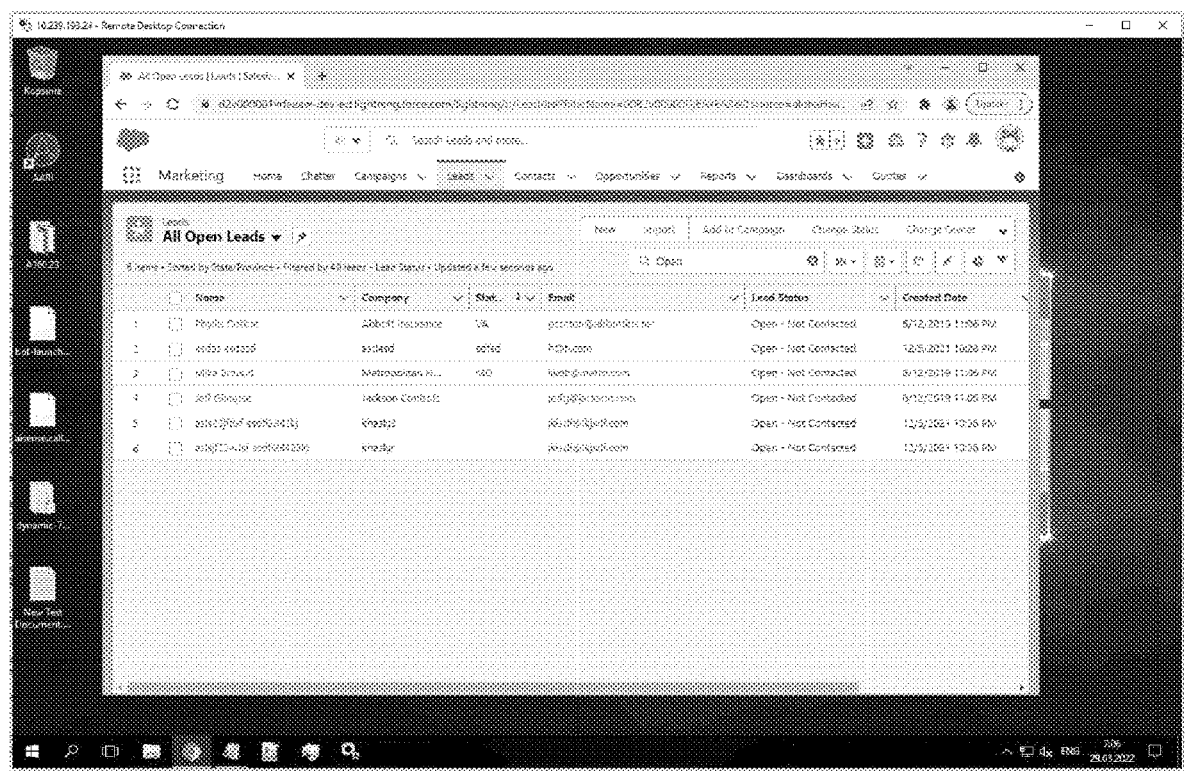
Figure 1C:
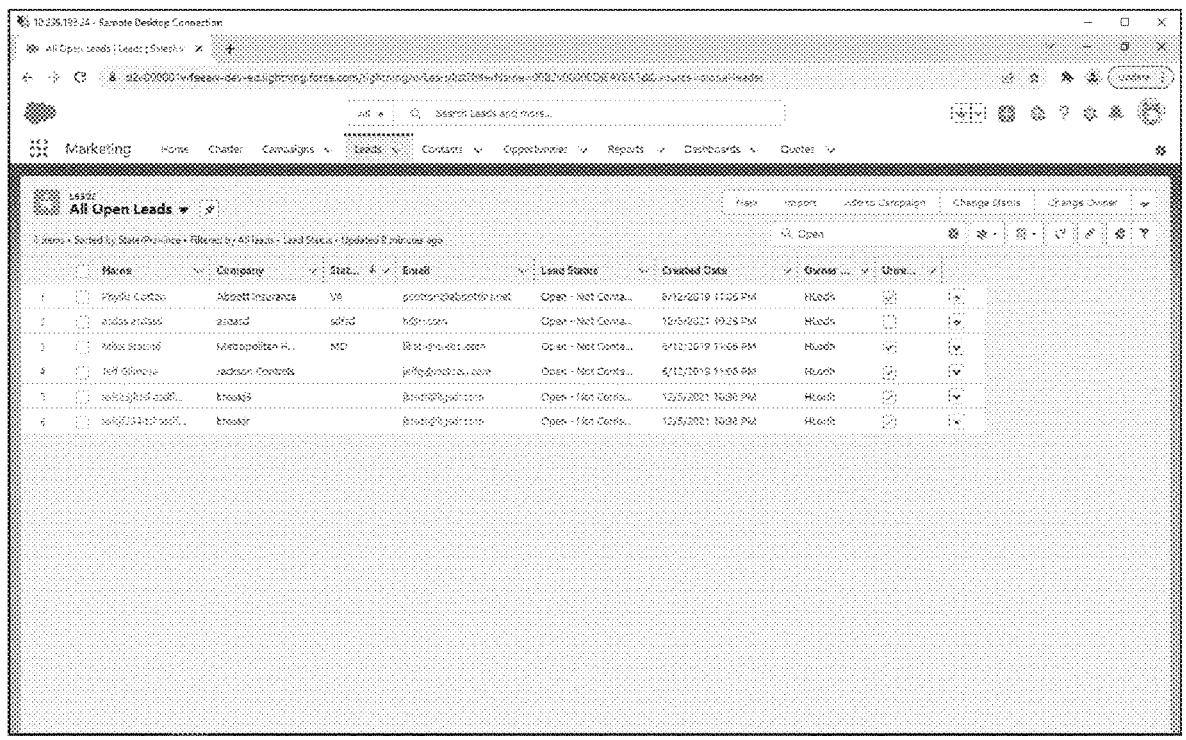
Figure 1D:
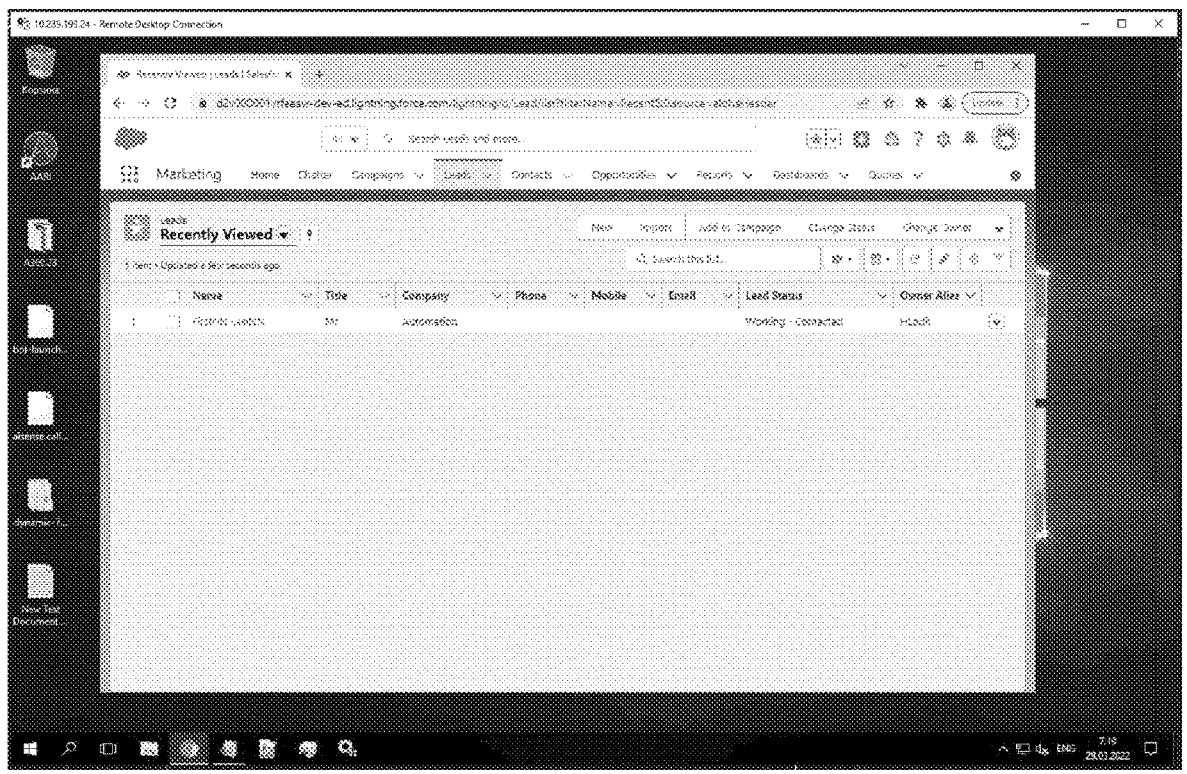
Figure 1F:
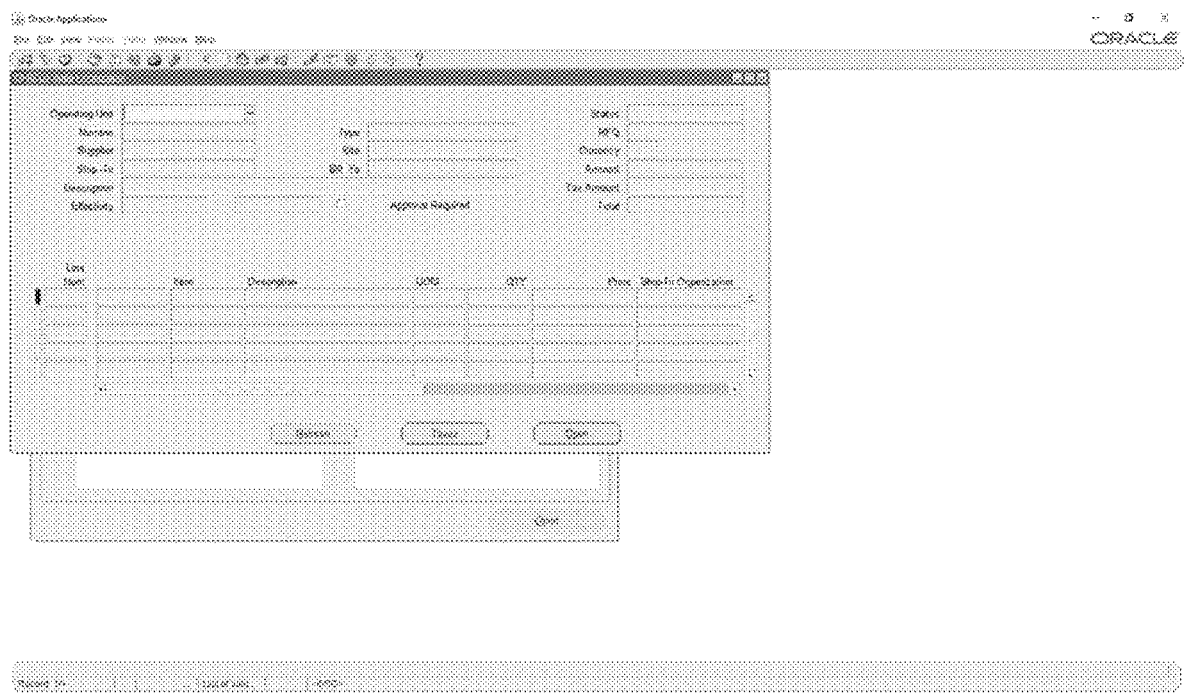
Figure 1G:
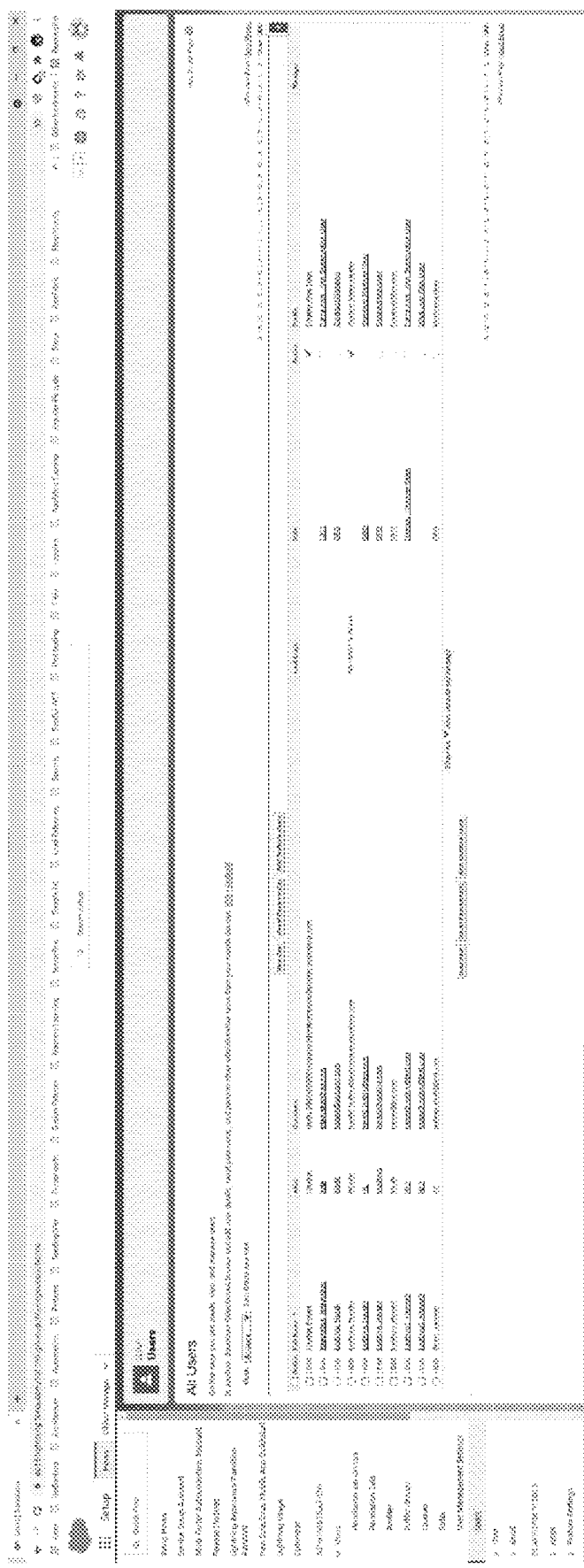

Embodiments disclosed herein concern improved techniques for recognition of tabularized data within an image and construction a computer-readable electronic table representing the recognized tabularized data. The image can be a screen image produced by a software application program operating on a computing device. The tabular data, such as pertaining to a table, can be recognized by recognizing rows, columns, text, controls and lines.

Image processing to extract object data pertain to various different objects that reside within the image. The object data can for example, pertain to text objects, control objects, lines or patterns that can be recognized within the image. Then, columns and rows for the table being recognized can be determined based on the extracted object data. Next, cells for the table can be determined from the determined columns and rows for the table. Content for the cells of the table can be extracted from the image and used to construct the computer-readable electronic table that represented the table in the image.

Advantageously, the improved techniques can enable automated extraction of table data from an image on a computer screen, and creation of a computer readable data structure capable of storing the extracted table data. In one embodiment, the improved techniques can be used in an RPA system such that tables displayed on a display screen by a computing device can be automatically recognized and extracted, and thereafter available for subsequent automatic operations using the RPA system.

The improved techniques permit content of tables within screen images to be retrieved and then used by computer systems operating various software programs (e.g., application programs). Consequently, RPA systems are able to accurately understand the content of tables within screen images so that users, application programs and/or software robots can operate on the screen images with increased reliability and flexibility. The screen images being received and processed can also be electronic images of documents.

An automation workflow process can carry out a process, such as a business process. By interrelating human tasks performed by users with robotic tasks performed by robotic agents operating on computing machines or external agents performed by applications (e.g., local or cloud-based), the workflow process platform can be network-based and utilize various users and computing machines that are affiliated with different groups (e.g., teams, departments) of an organization. Advantageously, the improved techniques can enable automation of business processes using various persons and robotic agents as well as external applications in an organized and controlled manner.

Generally speaking, RPA systems use computer software to emulate and integrate the actions of a human interacting within digital systems. In an enterprise environment, these RPA systems are often designed to execute a business process. In some cases, the RPA systems use Artificial Intelligence (AI) and/or other machine learning capabilities to handle high-volume, repeatable tasks that previously required humans to perform. The RPA systems support a plurality of software robots. More specifically, the RPA systems provide for creation, configuration, management, execution, monitoring, and/or performance of software robots.

Software robots can also be referred to as robotic agents, software agents, or bots. A software robot can interpret and execute tasks on your behalf. Software robots are particularly well suited for handling a lot of the repetitive tasks that humans perform every day. Software robots can perform a task they are tasked with and do it consistently and reliably each time. As one example, a software automation process can locate and read data in a document, email, file, or window. As another example, a software robot can connect with one or more Enterprise Resource Planning (ERP), Customer Relations Management (CRM), core banking, and other business systems to distribute data where it needs to be in whatever format is necessary. As another example, a software robot can perform data tasks, such as reformatting, extracting, balancing, error checking, moving, copying, and the like. As another example, a software robot can grab data desired from a webpage, application, screen, file, or other data source. As still another example, a software robot can be triggered based on time or an event, and can serve to take files or data sets and move them to another location, whether it is to a customer, vendor, application, department, or storage.

Embodiments of various aspects of the invention are discussed below with reference to FIGS. 1-20. However, those skilled in the art will readily appreciate that the detailed description given herein with respect to these figures is for explanatory purposes as the invention extends beyond these limited embodiments.

The various aspects disclosed herein can, but need not, be utilized with or by robotic process automation systems. Exemplary robotic process automation systems and operations thereof are detailed below.

Figure 2:
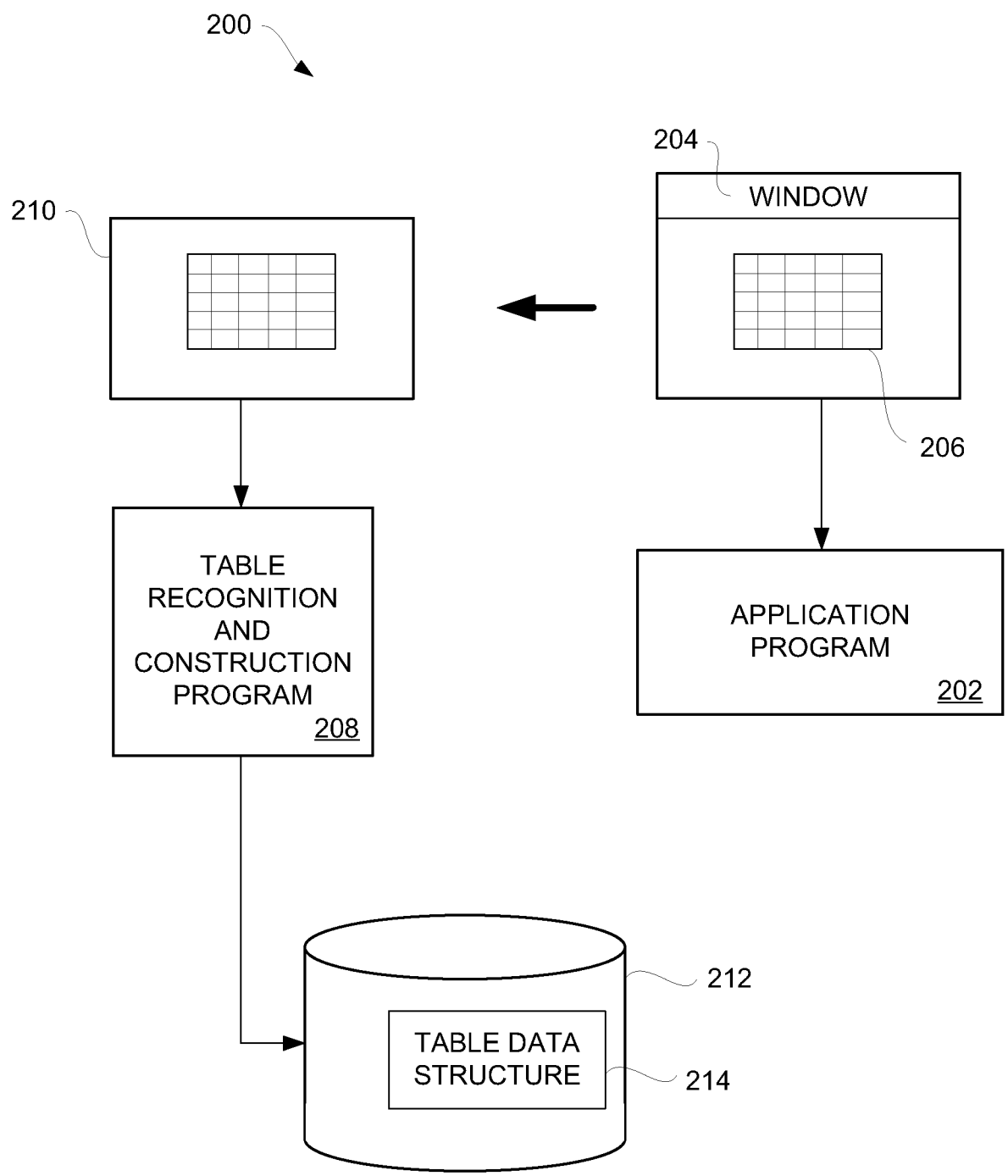
FIG. 2 is a block diagram of a table extraction system according to one embodiment.

FIG. 2 is a block diagram of a table extraction system 200 according to one embodiment. The table extraction system 200 can operates on one or more computing devices. An application program 202 can execute on the one or more computing devices to produce a screen image within a screen window 204 that can be presented on a display device associated with the one or more computing devices. The screen image includes an image of a table 206. Additionally, the table extraction system 200 includes a table recognition and construction program 208 that can execute on the one or more computing devices, which can be the same or different computing device that executes the application program 202. The table recognition and construction program 208 does not have access to the application program 202. However, the table recognition and construction program 208 can acquire a captured image 210 (e.g., screenshot) of the screen image as being produced within the screen window 204 by the application program 202. For example, an operating system operating on the one or more computing devices can allow for access to the screen image within the screen window 204. The captured image 210 includes an image of the table that is to be recognized and constructed into a computer readable format. By processing the captured image 210, the content and structure for the table can be determined in an automated, computer-implemented manner. Thereafter, the content and structure for the table can be stored to a data store 212, such as in a table data structure 214 stored in the data store 212. The processing by the table recognition and construction program 208 includes image processing to extract object data pertaining to various different objects that reside within the captured image. The object data can, for example, pertain to text objects, control objects, lines or patterns. Then, columns and rows for the table being recognized can be determined based on the extracted object data. Next, cells for the table can be determined from the determined columns and rows for the table. Content for the cells of the table can be extracted from the captured image and then used to construct the computer-readable electronic table that represents the table being recognized in the captured image.

Figure 3:
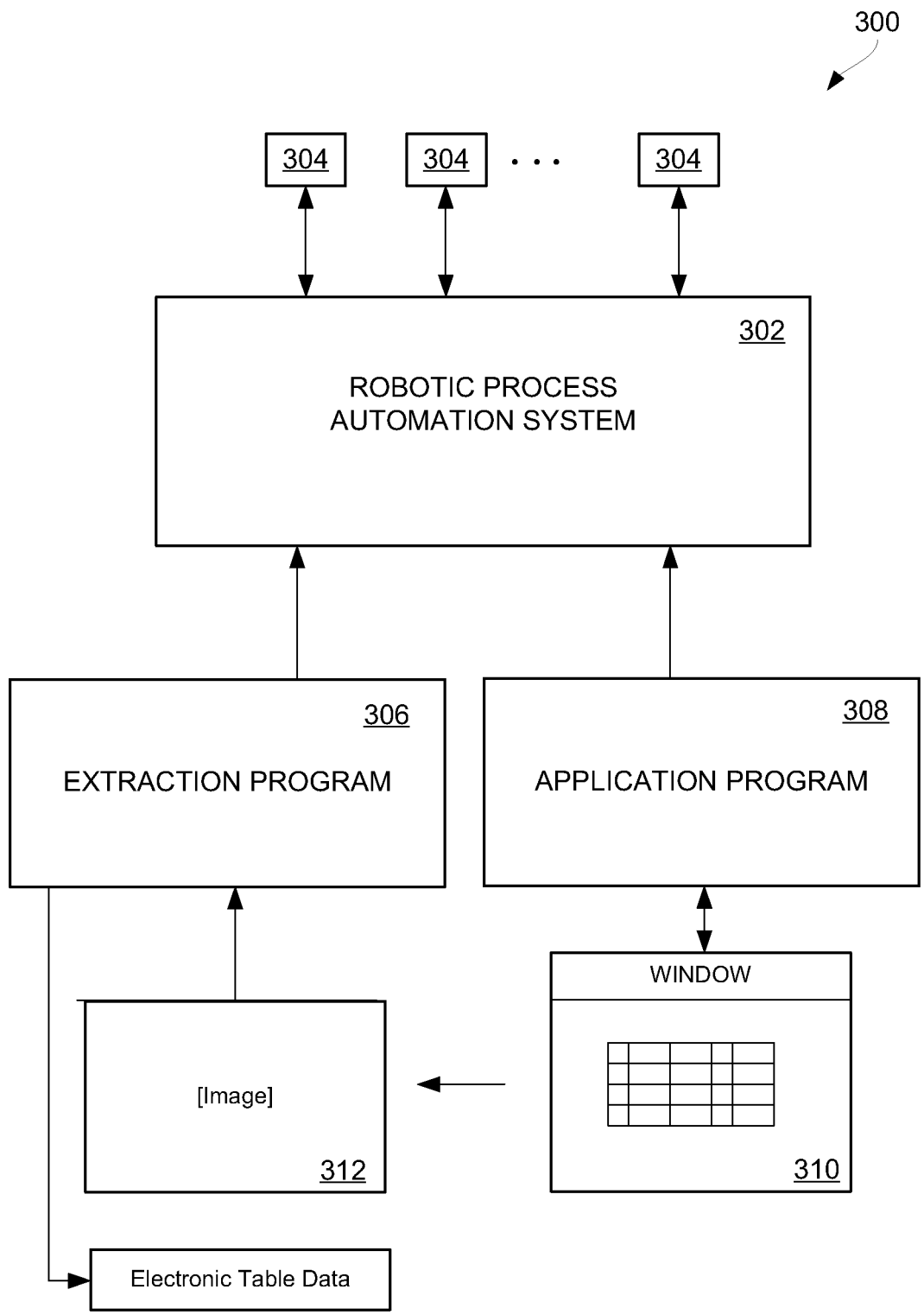
FIG. 3 is a block diagram of a programmatic automation environment according to one embodiment.

FIG. 3 is a block diagram of a programmatic automation environment 300 according to one embodiment. The programmatic automation environment 300 supports robotic process automation. The programmatic automation environment 300 can include or make use of one or more computing devices. Each of the computing devices can, for example, be an electronic device having computing capabilities, such as a mobile phone (e.g., smart phone), tablet computer, desktop computer, portable computer, server computer, and the like.

The programmatic automation environment 300 can include a robotic process automation system 302 that provides the robotic process automation. The robotic process automation system 302 supports a plurality of different robotic processes, which are denoted software automation processes 304. These software automation processes 304 can also be referred to as "software robots," "bots" or "software bots." The robotic process automation system 302 can create, maintain, execute, and/or monitor software automation processes 304. The robotic process automation system 302 can also report status or results of the software automation processes 304.

On execution of one or more of the software automation processes 304, the software automation processes 304, via robotic process automation system 302, can interact with one or more software programs. One such software program is an extraction program 306. The extraction program 306, when operating, can seek to extract content from tabular structures (e.g., tables) present within images. By extracting the content from tabular structures, the content from the tabular structures can be utilized by the one or more of the software automation processes 304.

The images, including the tabular data, that are to be processed are typically digital images of screens, and often include text and graphical objects, with some of the text and graphical objects pertaining to one or more tables within the digital images. The RPA system 302, as detailed herein, can include sophisticated processing and structures to support the extraction of data from such digital images, and in particular extraction of data from tables within the digital images.

When robotic process automation operations are being performed, the robotic process automation system 302 seeks to interact with an application program 308. However, it may be that the robotic process automation system 302 is not permitted to access the application program 308. Instead, the extraction program 306 can be permitted to receive an image 312 of an application window 310 presented by the application program 308. It is the application window 310 that is presenting a table of data that is desired. The extraction program 306 can perform image processing on the image 312 as discussed herein to recognize and construct a computer readable version 314 of the table presented in the application window 310. The robotic process automation system 302 is then able to access the content of the table from the computer readable version 314 of the table that has been constructed by the extraction program 306.

By doing so, the software automation process 304 being carried out via the robotic process automation system 302 can effectively interface with the table produced by the application program 308 as would a user, even though no user is involved because the actions by the software automation process 304 are programmatically performed. Once the content of the table is captured and understood, the robotic process automation system 302 can perform an action requested by the software automation process 304 by inducing a programmatic action.

Figure 4:
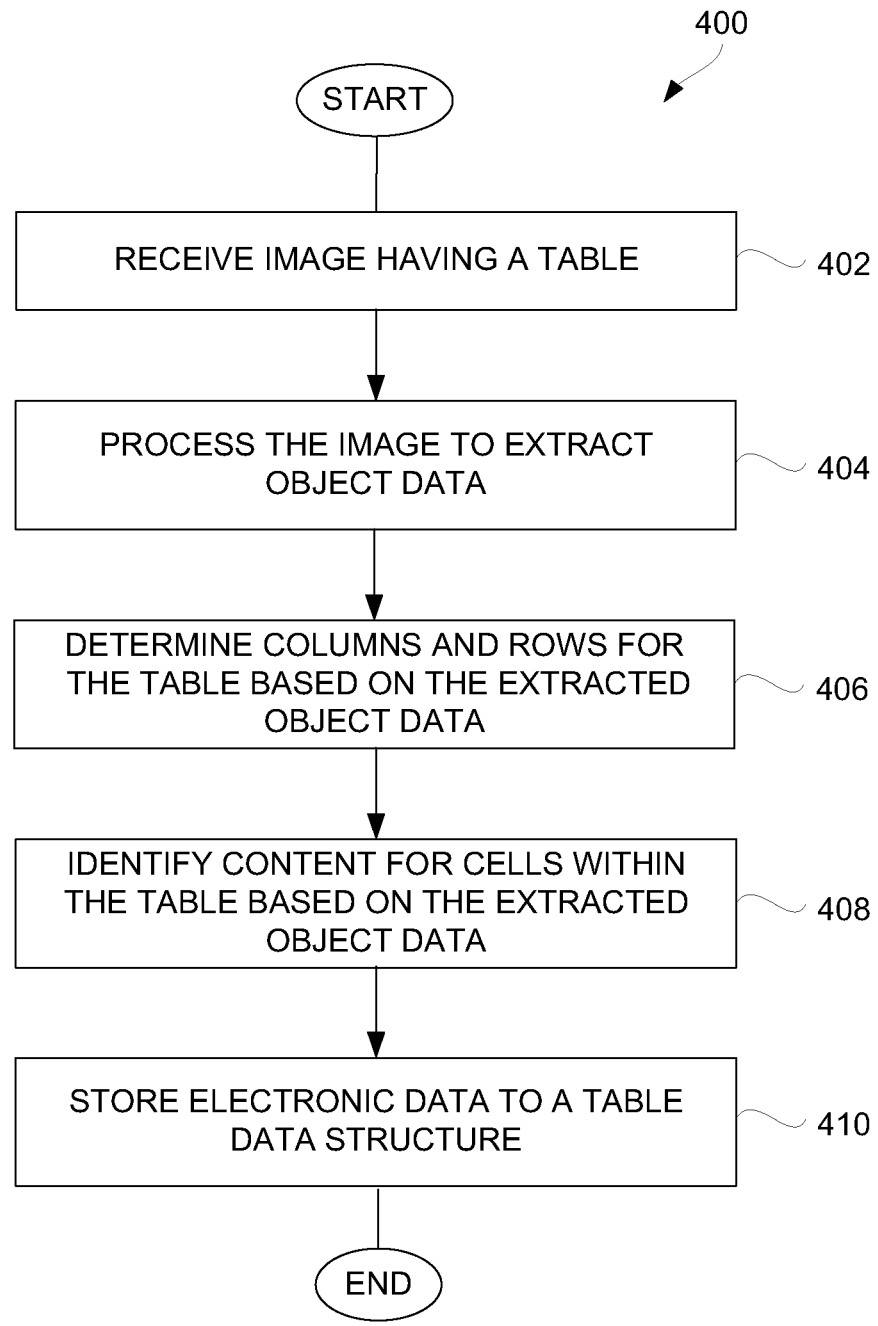
FIG. 4 is a flow diagram of a table extraction process according to one embodiment of the invention.

FIG. 4 is a flow diagram of a table extraction process 400 according to one embodiment of the invention. The table extraction process 400 is, for example, performed by a computing device, such as a server computer, personal computer, mobile or stationary computer, or the like.

The table extraction process 400 can receive 402 an image that includes a table. The image is a digital image. In one implementation, the image can correspond to a computer screen image, that is, an image derived from or associated with the computer screen. Alternatively, in another implementation, the image can correspond to a document, that is, an image derived from the document. In either implementation, the image has potentially one or more tables residing therein. The table extraction process 400 concerns processing that seeks to extract data from the one or more tables residing within the image.

After the image has been received 402, the image can be processed 404 to extract object data. The object data being extracted can pertain to various different objects that reside within the image. The object data can for example, pertain to text objects, control objects, lines or patterns that can be recognized within the image.

Next, columns and rows for the table can be determined 406 based on the extracted object data. In doing so, cells for the table being extracted are understood from the determined columns and rows for the table. Then, content for cells within the table can be identified 408 based on the extracted object data. Thereafter, electronic data for the extracted table can be stored 410 to a table data structure residing in memory. The electronic data can at least correspond to the identified content that was determined to be present in the cells of the table. In one implementation, the electronic data can also include at least descriptive data for the structure of the table, e.g., columns, row and/or cells. Following the storage 410 of the electronic data, the table extraction process 400 can end.

Figure 5:
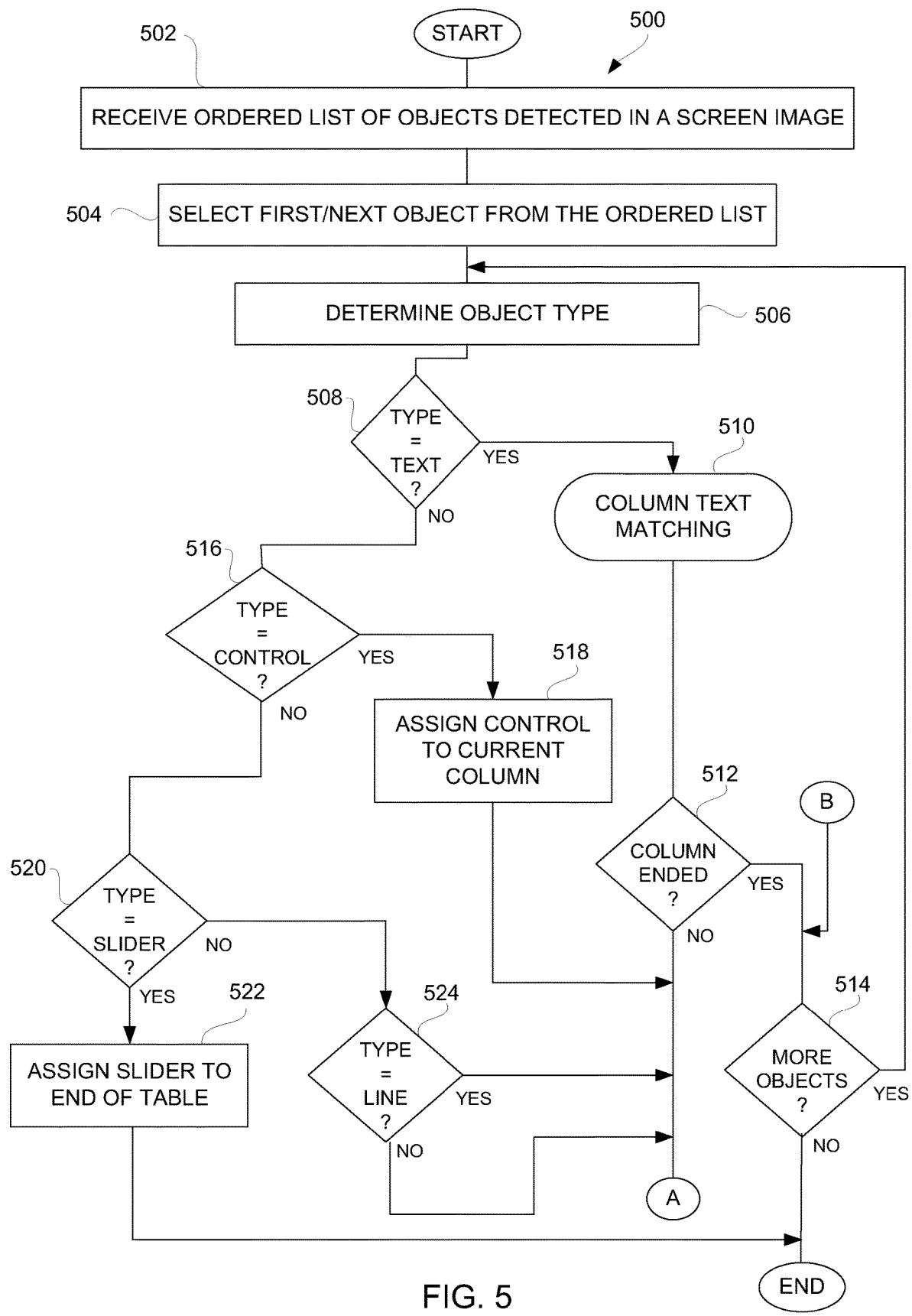
FIG. 5 is a flow diagram of a column detection process according to one embodiment.

FIG. 5 is a flow diagram of a column detection process 500 according to one embodiment. The column detection process 500 can, for example, be performed by a computing device, such as a server computer, personal computer, mobile or stationary computer, and the like.

The column detection process 500 can receive 502 an ordered list of objects that have been detected in a screen image. For example, the objects can be detected within a screen image such as by direct object introspection via a computing device, and may use machine learning models to support the detection. The objects can, for example, include controls, such as check boxes, radio buttons, images, combo boxes, text boxes, tree views, etc. In one implementation, the ordered list of objects detected can pertain to a first row of a candidate table recognized within the screen image using a masking process. After the ordered list of objects has been received 502, a first object can be selected 504 from the order list of objects.

Figure 7:
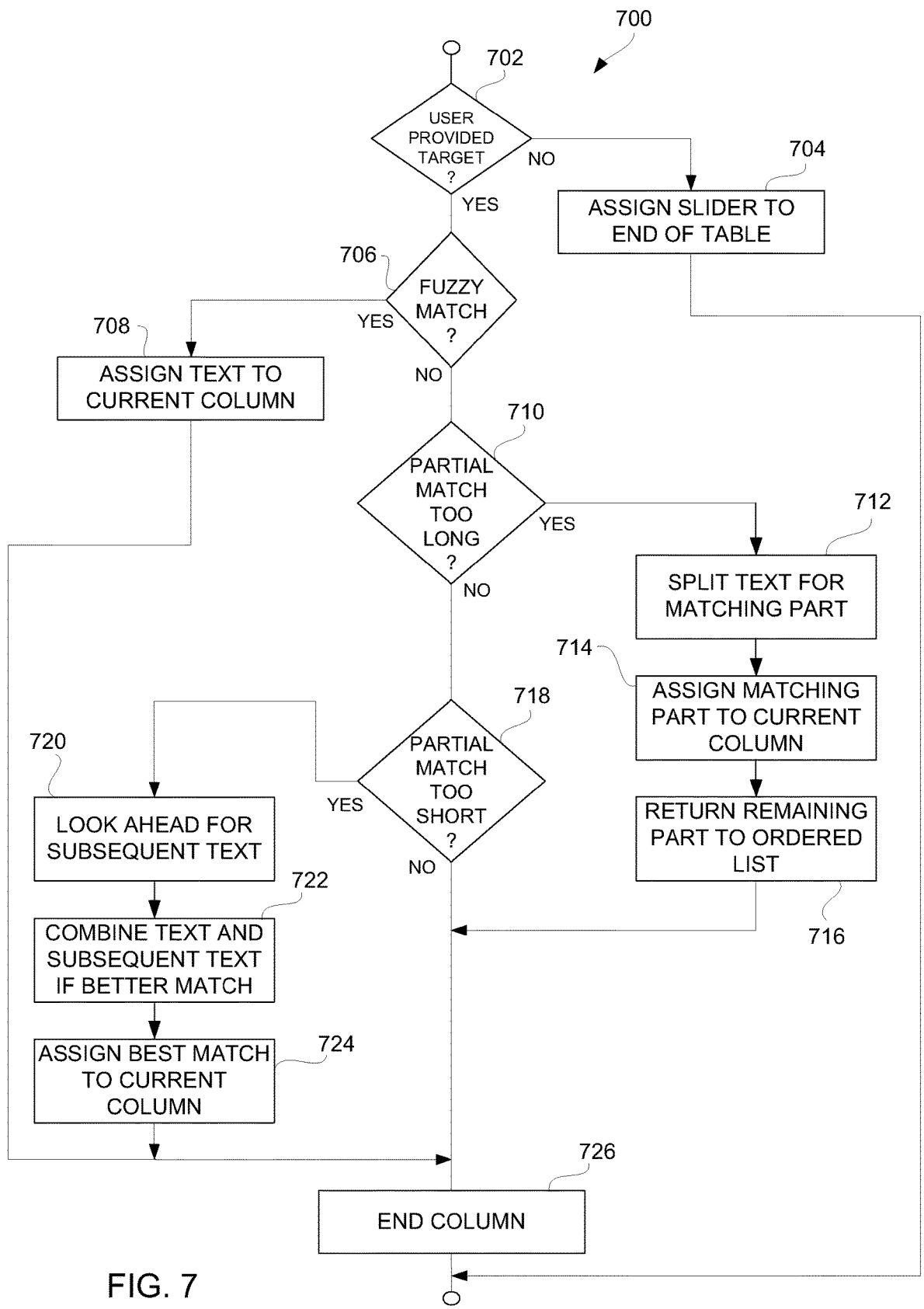
FIG. 7 is a flow diagram of a column text match process according to one embodiment.

Next, an object type can be determined 506 for the selected object. A decision 508 can then determine whether the object type for the selected object is "text". When the decision 508 determines that the object type for the selected object is "text", then a column text matching process 510 can be invoked. FIG. 7 discussed below illustrates one embodiment of a column text matching process.

Following the column text matching process 510, a decision 512 can determine whether the column under consideration has ended. For example, a column can be marked as completed once the column under consideration has ended. When the decision 512 determines that the column under consideration has ended, then a decision 514 can determine whether there are more objects within the order list of objects to be considered. When the decision 514 determines that there are more objects within the order list of objects to be considered, then the column detection process 500 returns to repeat the block 504 so that a next object from the order list of objects can be selected and similarly processed.

On the other hand, when the decision 508 determines that the object type for the selected object is not "text", then a decision 516 determines whether the object type for the selected object is "control". When the decision 516 determines that the object type for the selected object is "control", then the control pertaining to the selected object can be assigned 518 to the current column of the table being recognized within the screen image.

Alternatively, when the decision 516 determines that the object type for the selected object is not "control", then a decision 520 determines whether the object type for the selected control is "slider". When the decision 520 determines that the object type for the selected object is "slider", then the slider pertaining to the selected object can be assigned 522 to the end of the table.

On the other hand, when the decision 520 determines that the object type for the selected object is not "slider", then a decision 524 can determine whether the object type for the selected object is "line". In this implementation, whether the object type is "line" or not is not important. Hence, following the decision 524, following the block 518, and also following the decision 512 when the column under consideration has not ended, additional processing can be performed to better consider the current column being considered. The additional processing, represented by connecting node A, is detailed below with respect to FIG. 6. However, following the completion of the additional processing, in most cases, the processing returns to the decision 514 to determine whether more objects within the order list of objects remain to be considered. If so, the column detection process 500 returns to repeat the block 504 so that additional objects from the order list can be processed. Alternatively, when there are no more objects within the order list to be considered, the column detection process 500 can end.

Following the block 522, as well as following the decision 514 when there are no more objects to be considered, the column detection process 500 can end with the columns for the table being recognized within the screen image.

Figure 6:
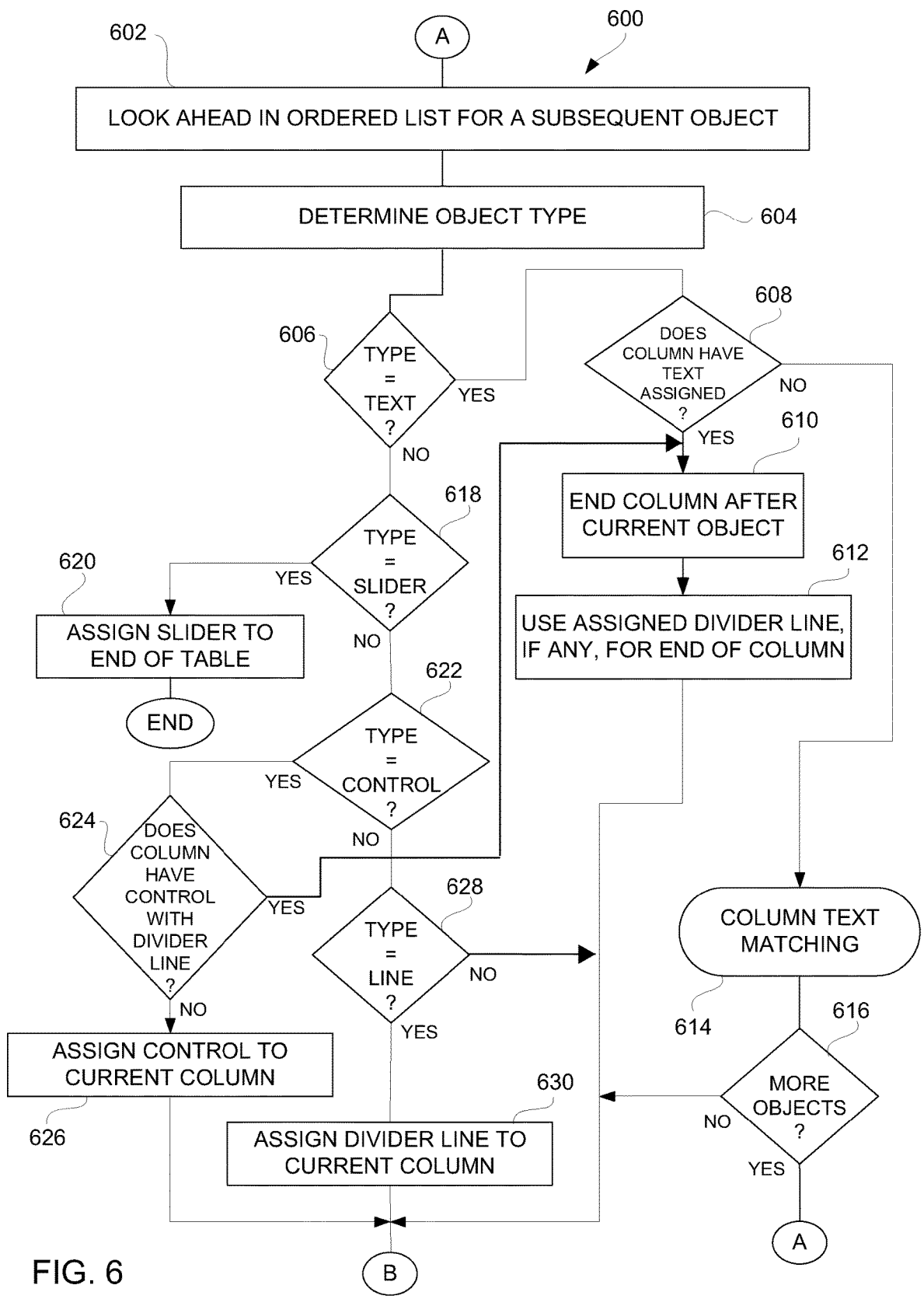
FIG. 6 is a flow diagram of a lookahead process according to one embodiment.

FIG. 6 is a flow diagram of a lookahead process 600 according to one embodiment. The lookahead process 600 is additional processing that can be utilized with the column detection process 500 illustrated in FIG. 5. The lookahead process 600 can also be performed by a computing device, such as a server computer, personal computer, mobile or stationary computer, and the like.

The lookahead process 600 is additional processing that can be performed while still considering a current object within the ordered list of objects in order to positionally identify the current column within the table being extracted from the image of the computer screen. The lookahead process 600 can lookahead 602 in the ordered list for a subsequent object. Then, the object type can be determined 604 for the subsequent object.

A decision 606 can determine whether the object type for the subsequent object is "text". When the decision 606 determines that the object type is "text", a decision 608 can determine whether the column already has text assigned to it. When the decision 608 determines that the column already has text assigned to it, then the current column under consideration can be ended 610 after the current object. Additionally, the end of the column can be distinguished by use 612 of an assigned divider line, if any. Following the block 612, the lookahead process 600 can end.

Alternatively, if the decision 608 determines that the current column does not have text assigned to it, then additional processing known as column text matching 614, which is detailed in FIG. 7, can be performed to assist with identifying appropriate text for the current column. Following the column text matching 614, a decision 616 can determine whether there are more objects within the ordered list of objects that could be considered for other subsequent objects. When the decision 616 determines that there are more objects in the ordered list to be considered, then the lookahead process 600 can return to the block 602 to again lookahead and process another subsequent object from the ordered list of objects in a similar manner. Alternatively, when the decision 616 determines that there are no more objects to be considered in the ordered list, then the lookahead process 600 can end.

On the other hand, when the decision 606 determines that the object type for the subsequent object is not text, a decision 618 determines whether the object type for the subsequent object is "slider". When the decision 618 determines that the object type for the subsequent object is "slider", then the slider pertaining to the subsequent object can be assigned 620 the end of the table under consideration. Following the assignment 620 of the slider to the end of the table, the lookahead process 600 as well as a column section process 500 can end since the end of the table has been found.

Alternatively, when the decision 618 determines that the object type for the subsequent object is not "slider", a decision 622 can determine whether the object type for the subsequent object is "control". When the decision 622 determines that the object type for the subsequent object is "control", then a decision 624 can determine whether the current column has a divider line assigned. When the decision 624 determines that the current column does have a divider line assigned, then the lookahead process 600 can proceed to the blocks 610 and 612 to end the current column and possibly use an assigned divider line. On the other hand, when the decision 624 determines that the current column does not have a divider line assigned, the control pertaining to the subsequent object can be assigned 626 to the current column. Following the block 626, the lookahead process 600 can end.

Finally, when the decision 622 determines that the object type for the subsequent object is not "control", a decision 628 can determine whether the object type for the subsequent object is "line". When the decision 628 determines that the object type for the subsequent object is "line", then a divider line pertaining to the selected object can be assigned 630 to the current column. Following the block 630, the lookahead process 600 can end. Also, when the decision 628 determines that the object type for the subsequent object is not "line", then the lookahead process 600 can also end. The lookahead process 600 can also end following the decision 616 when there are no more objected within the ordered list of objects to be processed.

FIG. 7 is a flow diagram of a column text match process 700 according to one embodiment. The column text match process 700 is, for example, processing performed by the column text matching 510 illustrated in FIG. 5 and/or the column text matching 614 illustrated in FIG. 6. The column text match process 700 can also be performed by a computing device, such as a server computer, personal computer, mobile or stationary computer, and the like.

The column text match process 700 can begin with a decision 702 that determines whether a user has provided a target. The target can, for example, pertain to text that would be present in a header for a table. For instance, a set of headers can be used to determine a table structure; hence, a user can provide a target as "Name" column as target or can provide as target "Name", "Company" and "State" columns which would restrict the table detection to a table with three (3) columns. Generally speaking, a header of a table is a cell or row at the top of a table that contains an identifier or label for the contents within one or more respective columns of the table. When the decision 702 determines that the user has not provided a target, then the text from the current object can be assigned 704 to the current column. Following the block 704, since there is no user provided target, the column text match process 700 can end.

On the other hand, when the decision 702 determines that there is a user provided target, a decision 706 can determine whether the text from the current object matches the target. The matching process for the decision 706 can utilize a fuzzy matching type of comparison, or another comparable matching technique, to permit some tolerance. When the decision 706 determines that the text from the current object does match the target, then the text from the current object can be assigned 708 to the current column.

Alternatively, if the decision 706 determines that the text from the current object does not match the target, then a decision 710 can determine whether there is a partial match that is too long. In this case, the text from the current object does match the target but the text is longer than the target. When the decision 710 determines that the partial match is too long, then the text for the current object can be split 712 into two parts, a matching part and a remaining part. The matching part can then be assigned 714 to the current column. The remaining part can be returned 716 to the ordered list for subsequent processing.

Alternatively, when the decision 710 determines whether there is a partial match that is too short. In this case, the text from the current object does match the target but the text is shorter than the target. When the decision 718 determines that there is a partial match that is too short, then the column text match process 700 can look ahead 720 in the ordered list for subsequent text. Next, the text can be combined 722 with the subsequent text if such results in a better match to the target. Thereafter, the text pertaining to the best match can be assigned 724 to the current column.

On the other hand, when the decision 718 determines that there is no partial match that is too short, then the column text match process 700 for the current column can end 726 without finding a text match. Also, following the blocks 708, 716 and 724, the column text match process 700 can end 726 and, in these cases, text has been assigned to the current column.

Figure 8A:
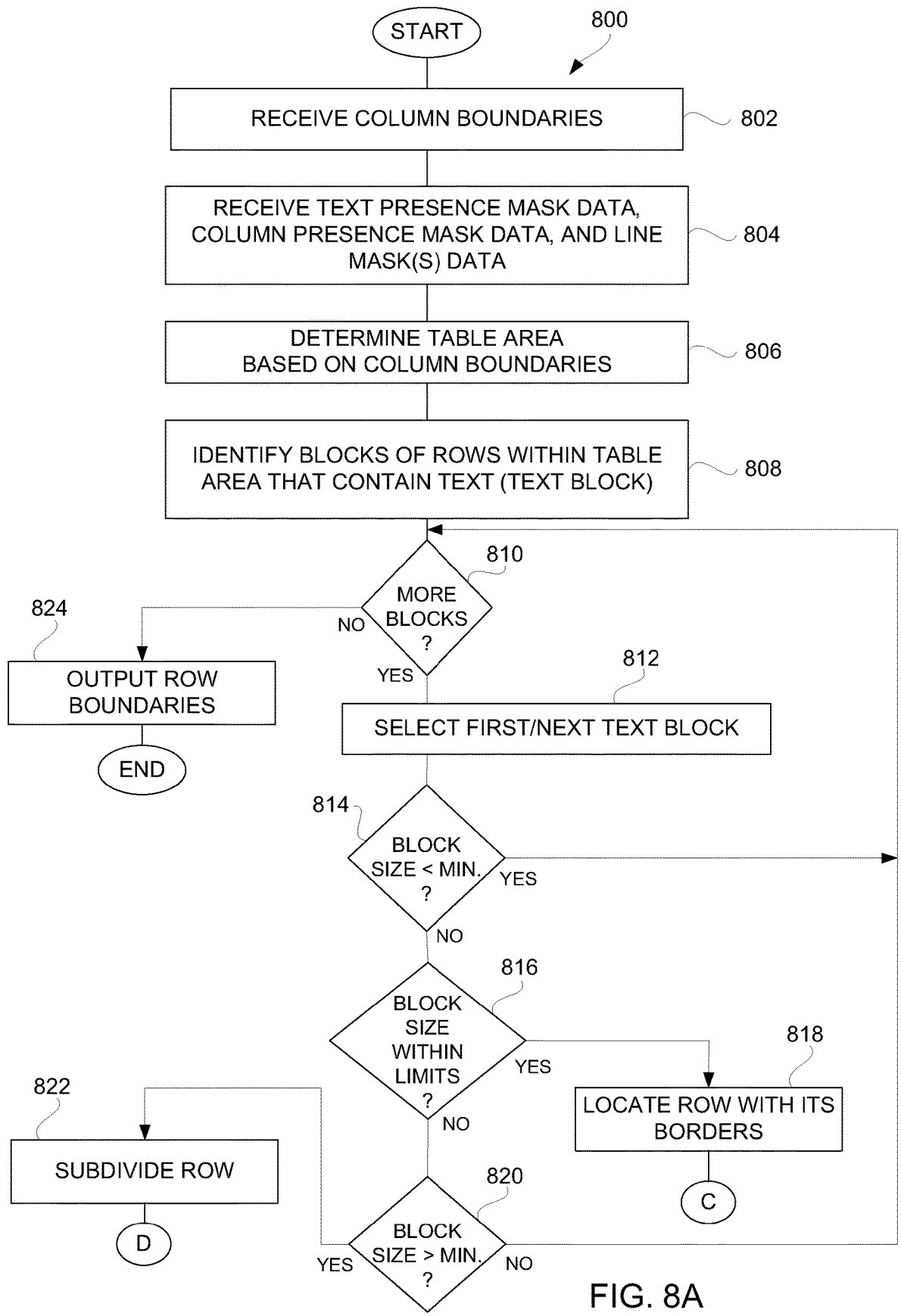
FIGS. 8A and 8B are flow diagrams of a row detection process according to one embodiment.
Figure 8B:
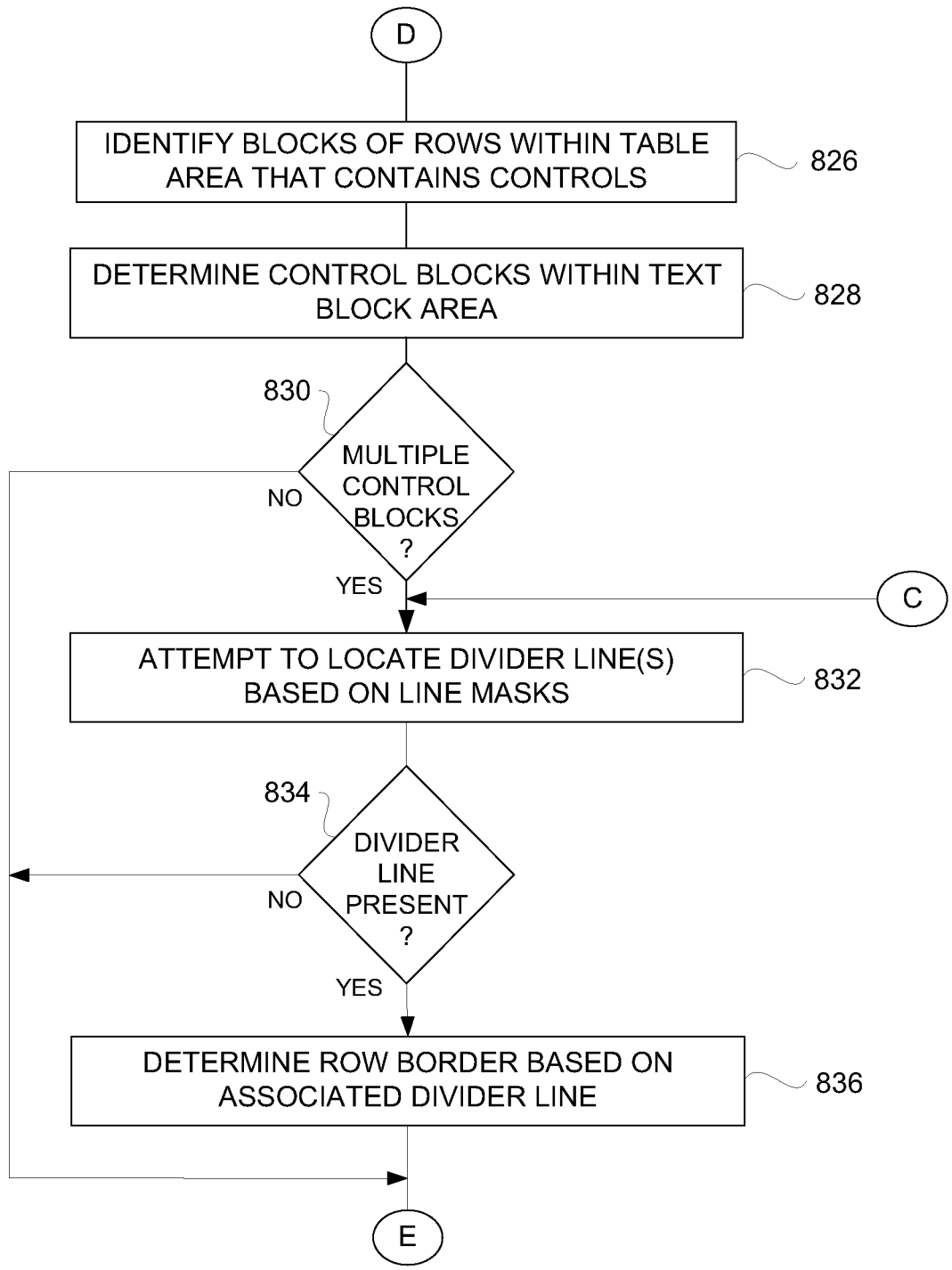

FIGS. 8A and 8B are flow diagrams of a row detection process 800 according to one embodiment. The row detection process 800 can, example, be performed by a computing device, such as a server computer, personal computer, mobile or stationary computer, and the like.

The row detection process 800 can receive 802 column boundaries, such as the column boundaries determined above with respect to the processing in FIG. 5. In addition, text presence mask data, column presence mask data, and line mask data can be received 804, as input data sources. These input data sources are data acquired from the image including the table to be recognized and extracted. A table area can then be determined 806 based on the column boundaries.

Next, blocks of rows within the table area that contain text can be identified 808. For example, the block of rows within the table area that contain text can be identified 808 via image processing that generates the text presence masks. These identified blocks can be referred to as text blocks. Subsequently, the row detection process 800 operates to perform processing on each of the text blocks. A decision 810 can determine whether there are more text blocks to be processed. When the decision 810 determines that there are more text blocks to be processed, a first or next text block can be selected 812.

After the text block has been selected 812, a decision 814 can determine whether a block size for the selected text block is less than a minimum size. When the decision 814 determines that the block size for the selected text block is less than the minimum size, then the selected text block can be ignored. Alternatively, when the decision 814 determines that the block size for the selected text block is not less than the minimum size, then a decision 816 can determine whether the block size for the selected text block is within size limits. The size limits typically correlate to a row height that has been found for previous rows, such as an average row height or an expected row height. When the decision 816 determines that the block size for the selected text block is within size limits, then a row with its borders can be located 818. Here, using the selected text block, the row border(s) can be located 818. Following the block 818, additional processing can be performed as depicted in FIG. 8B.

On the other hand, when the decision 816 determines that the block size for the selected text block is not within size limits, a decision 820 can determine whether the block size for the selected text block greater than a maximum size. When the decision 820 determines that the block size for the selected text block is greater than the maximum size, then the row under consideration can be subdivided 822. Following the block 822, additional processing can be performed as depicted in FIG. 8B. On the other hand, when the decision 820 determines that the block size for the selected text block is not greater than the maximum, then the row detection process 800 can return to repeat the decision 810 and subsequent blocks so that additional text blocks can be similarly processed. Also, when the decision 814 determines that the block size for the selected text block is not less than the minimum, then the row detection process 800 can return to repeat the decision 810 and subsequent blocks so that additional text blocks can be similarly processed.

As shown in FIG. 8B, following the block 822 illustrated in FIG. 8A, blocks of rows within the table area that contain controls can be identified 826. These blocks can be referred to as control blocks. The control blocks within the text block area can then be determined 828.

Next, a decision 830 can determine whether multiple control boxes are found within the text block area. When the decision 830 determines that there are multiple control blocks within the text block area (or directly following the block 822), the row detection process 800 can attempt 832 to locate divider lines based on the line masks. Also, following block 818 shown in FIG. 8A, the blocks of rows within the table area that contain controls can be identified 826.

Next, a decision 834 can determine whether a divider line is present. When the decision 834 determines that a divider line is present, then a row border can be determined 836 based on the associated divider line.

Following the block 836, the row detection process 800 can return to repeat the decision 810 and subsequent blocks so that additional text blocks can be processed. Also, following the decision 830 when there are not multiple control blocks within the text block area as well as following the decision 834 when there is no divider line present, the row detection process 800 can also return to repeat the decision 810 and subsequent blocks so that additional text blocks can be processed (see FIG. 8A).

Figure 9:
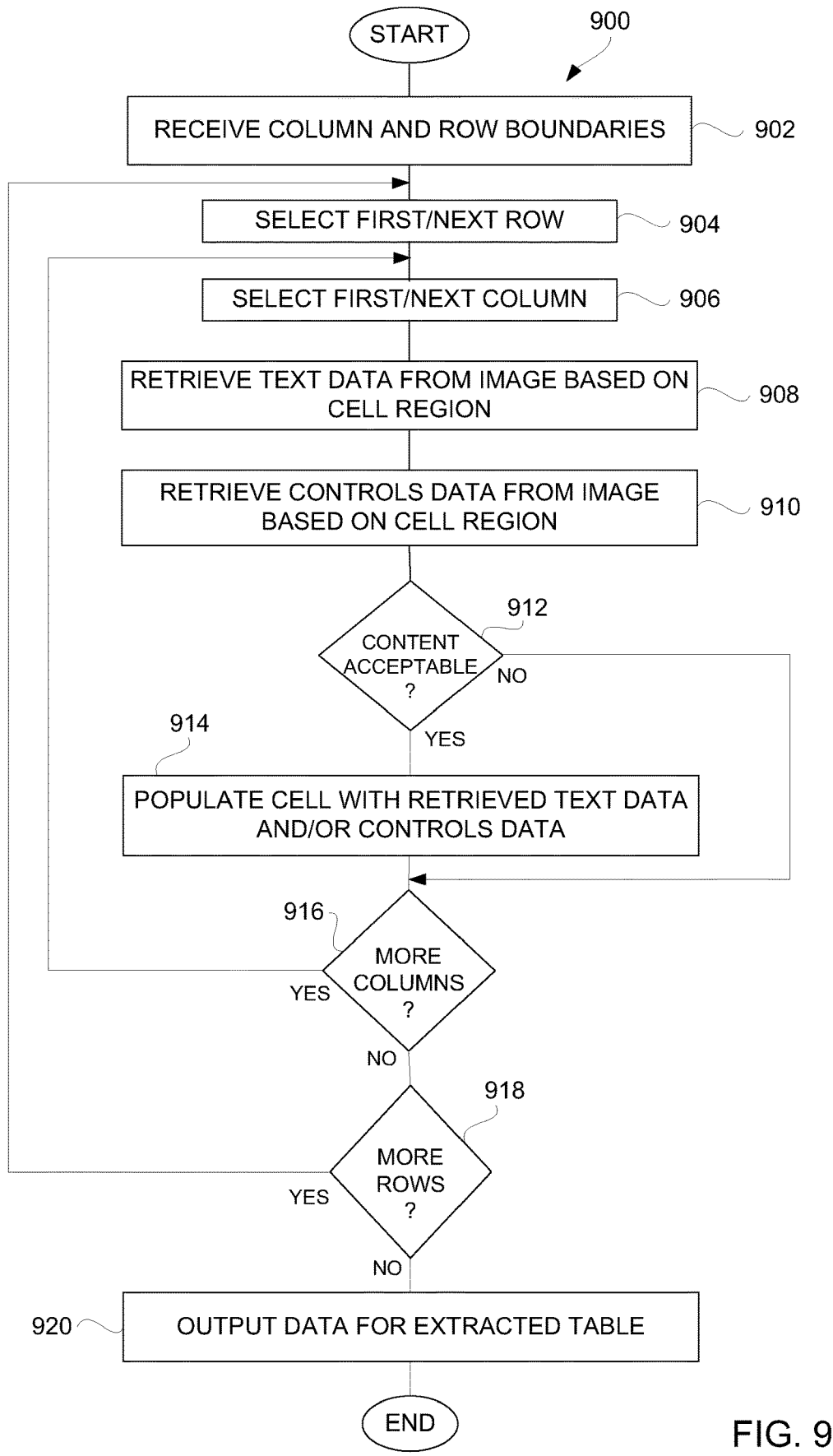
FIG. 9 is a flow diagram of a cell population process according to one embodiment.

FIG. 9 is a flow diagram of a cell population process 900 according to one embodiment. The cell population process 900 can, for example, be performed by a computing device, such as a server computer, personal computer, mobile or stationary computer, and the like. Generally speaking, the cell population process 900 can receive rows and columns for a table being recognized within an image, and then step through the rows and columns to identify cell positions, retrieve the appropriate content for those cell positions, and finally store a resulting electronic table with its content to electronic memory. Such processing is further detailed in FIG. 9 as follows.

The cell population process 900 can receive 902 the column and row boundaries previously determined. Following the block 902, a first row can be selected 904. A first column can also be selected 906. After the row and column has been selected 904 and 906, a cell region is effectively identified. Next, text data can be retrieved 908 from the image based on the cell region. Similarly, controls data can be retrieved 910 from the image based on the cell region.

Next, a decision 912 can then determine whether the content that has been retrieved is acceptable. For example, the acceptability of the content can be based on its alignment with respect to the cell region. If the content does not significantly align with the cell region, the content can be considered not acceptable to be used. However, when the decision 912 determines that the content is acceptable, the particular cell under consideration can be populated 914 with the retrieved text data and or controls data. Alternatively, of the decision 912 determines that the content is not acceptable, then the particular cell under consideration is not populated because the block 914 can be bypassed.

Next, a decision 916 can determine whether there are more columns of the table to be considered. When the decision 916 determines that there are more columns to be considered, the cell population process 900 returns to repeat the block 906 so that a next column can be selected. After the next column has been selected 906, the next column can be similarly processed for the associated cell region. Alternatively, when the decision 916 determines that there are no more columns to be considered, then a decision 918 can determine whether there are more rows to be considered. When the decision 918 determines that there are more rows to be considered, the cell population process 900 can return to repeat the block 904 so that a next row can be selected. After the next row is been selected 904, the next row can be similarly processed across the various columns.

Eventually, when the decision 918 determines that there are no more rows to be considered, all the cells within the electronic table being constructed have been considered and populated as appropriate. Hence, the cell population process 900 can output 920 data for the extracted table. Following the block 920, the cell population process 900 can end.

An exemplary description of steps that can be involved in constructing a table based upon image analysis are described below with respect to FIGS. 10-15C. In one embodiment, table extraction from an image is based on image analysis. The image initially can undergo image processing to determine some attributes of the image that can be used by the image analysis. According to one embodiment, the attributes can include control objects, text objects, and horizontal and/or vertical line data.

FIG. 10 illustrates an exemplary image of a table 1000 that can be processed. The image of the table 1000 can be presented on a screen display by an application program operating on a computer system. As depicted, the table 1000 can include columns and rows that form cells of the table 1000. In this example, the table 1000 has five (5) columns and six (6) rows, with the first of the rows being a header row.

The initial image processing can determine or receive certain attributes from the image. Control objects can, for example, be found within the image, such as using a machine learning inference model. The control objects can be described by a set of rectangular coordinates for each of the control objects along with information such as the type and confidence of each control. Examples of the different types of control objects can include text boxes, check boxes, scroll bars, etc. FIG. 11 illustrates recognition of control objects with respect to the table 1000 illustrated in FIG. 10.

Figure 12:
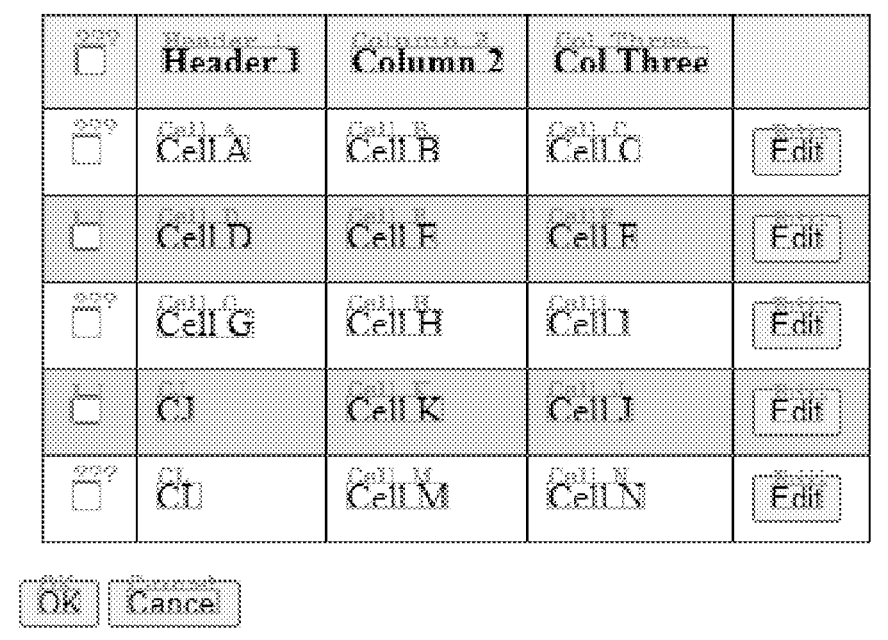

The initial image processing can also determine or receive text objects, such as text regions. The text objects can be found within the image, such as using an OCR engine. The text objects can be described by a set of rectangular coordinates for each of the text objects along with information such as information on individual characters and groupings of words or text lines. FIG. 12 illustrates recognition of text objects with respect to the table 1000 illustrated in FIG. 10.

Further, the initial image processing can determine or receive horizontal and vertical lines. In one embodiment, the image can be processed using a combination of Canny edge detection and morphological transformations, to create binary "mask" images containing information about the presence of horizontal and vertical lines within the image. FIG. 13A illustrates determined horizontal lines with respect to the table 1000 illustrated in FIG. 10. FIG. 13B illustrates determined vertical lines with respect to the table 1000 illustrated in FIG. 10.

Figure 14B:
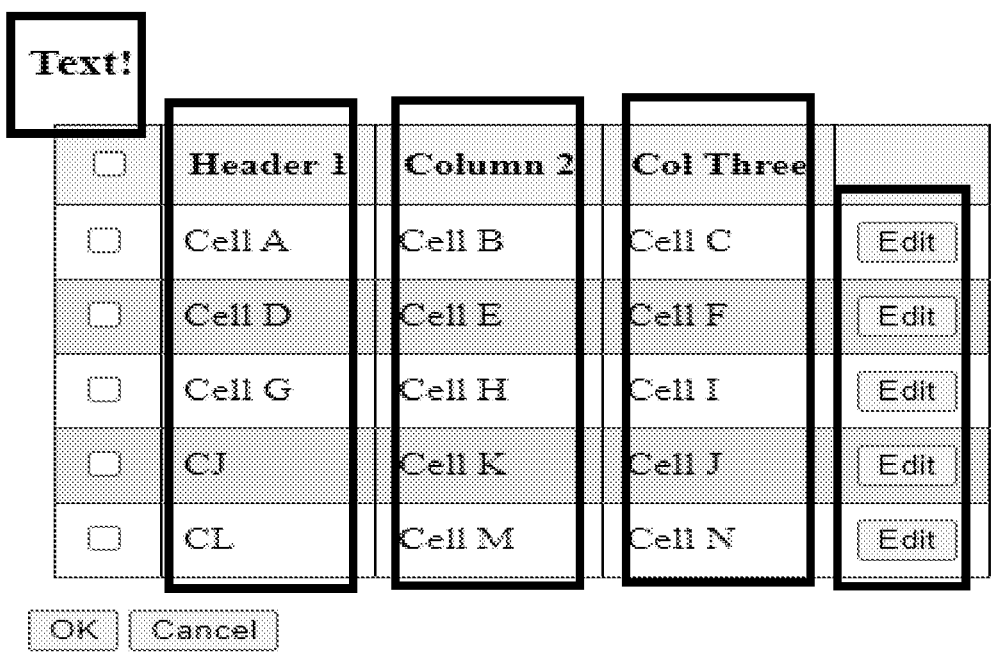
FIG. 14B illustrates a binary mask pertaining to determined vertical text regions with respect to the table illustrated in FIG. 10.

Still further, the text objects (e.g., text regions) recognized from the image, such as noted in FIG. 12, can be expanded to create a binary mask of text regions. The text regions are areas on the image that contain or are near any text. FIG. 14A illustrates a binary mask pertaining to determined horizontal text regions with respect to the table 1000 illustrated in FIG. 10. FIG. 14B illustrates a binary mask pertaining to determined vertical text regions with respect to the table 1000 illustrated in FIG. 10.

Following the initial image processing, one or more candidate tables can be identified as being within the image. As one alternative, a user can define a target table to be extracted from the image. For example, the user can define the target table based on a table header target, such as a first textual header column of the target table. In this alternative, the table header target can be compared with at least some of the determined text objects within the image. The comparison can utilize fuzzy text matching to provide a degree of tolerance. Those of the determined text objects that sufficiently match can be considered candidate tables within the image.

Figure 15A:
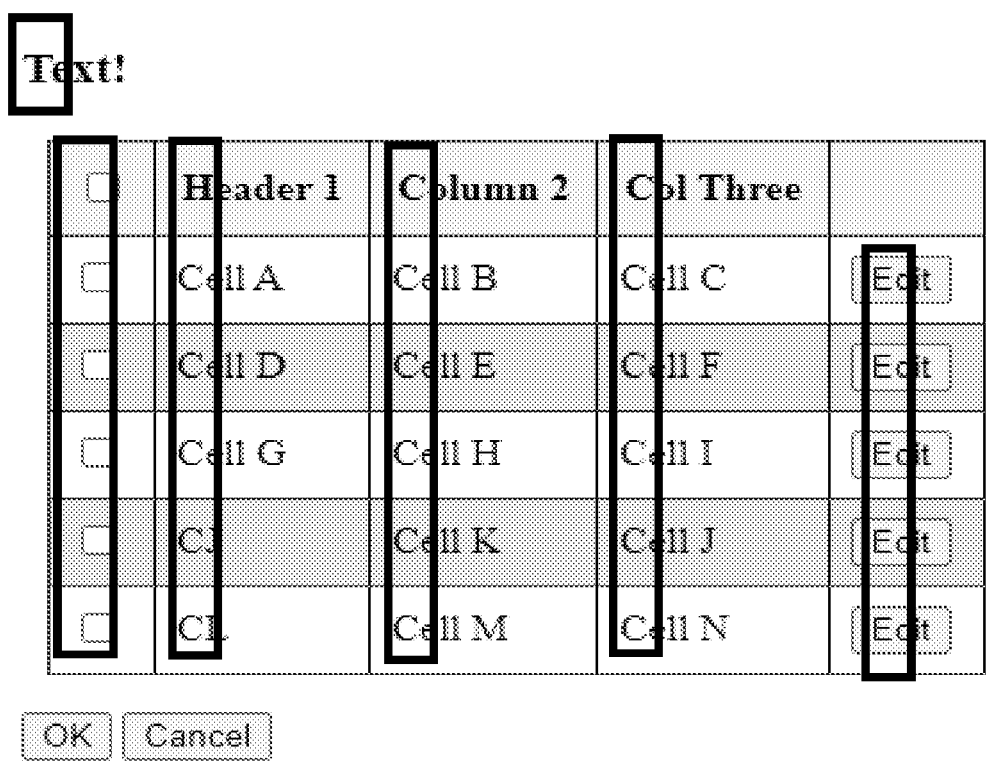
FIG. 15A illustrates an exemplary first processed image mask for identifying vertical stripes of text regions with respect to the table illustrated in FIG. 10.
Figure 15C:
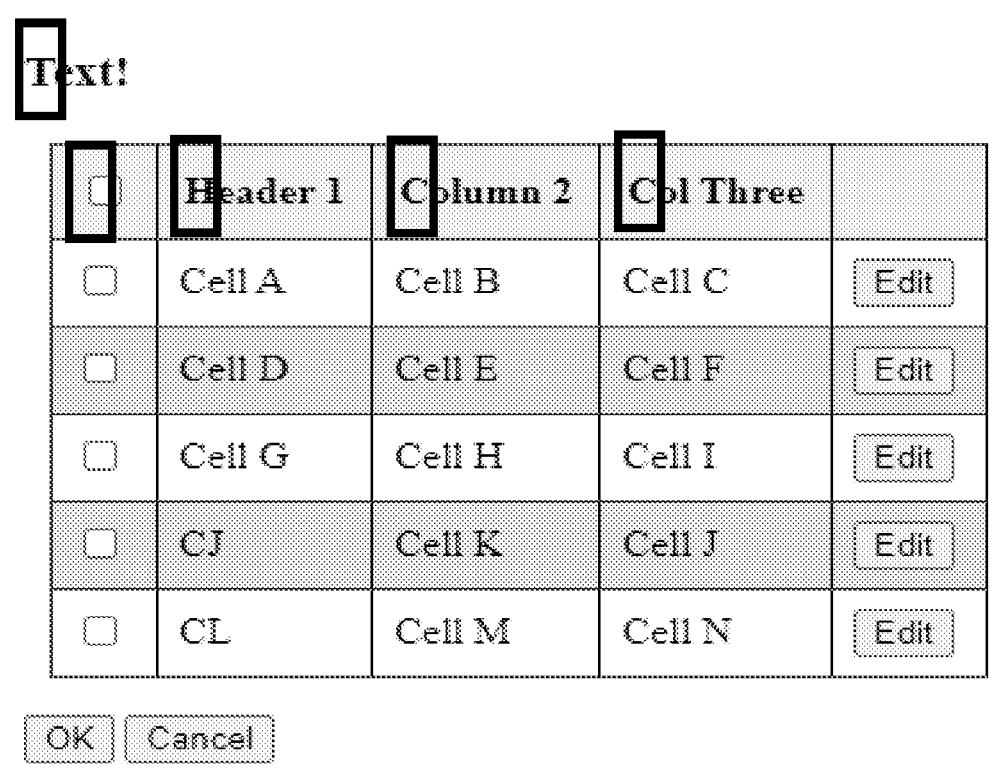

As another alternative, if the user has not assisted the processing by adequately defining a target table to be extracted from the image, then an automatic detection of candidate tables can be performed. In such case, possible candidates for tables can be identified from the image using one or more processed image masks. A first processed image mask can be used to identify vertical "stripes" of text regions, which are aligned with each other, either by their left edge, center point, or right edge. This first processed image mask can be used to locate multiple repeating rows of text with alignment, which serves as an indication of where a table might likely be. FIG. 15A illustrates an exemplary first processed image mask for identifying vertical stripes of text regions with respect to the table 1000 illustrated in FIG. 10. A second processed image mask can be used to filter down the vertical "stripes" of text regions to regions that have some form of outer border lines near its top, which could be its table header. In one implementation, the second processed image mask can be determined by combining the first processed image mask with a mask of the areas below and to the right of a horizontal and vertical line intersection, as well as the intersections that form a "T" intersection but not a "+" intersection. FIG. 15B illustrates an exemplary second processed image mask for identifying table header regions with respect to the table 1000 illustrated in FIG. 10. The second processed image mask can be further processed to produce a third processing image mask. FIG. 15C illustrates an exemplary third processed image mask locating table candidates. In one implementation, the second processed image mask can be intersected with text regions to generate table candidates.

For each table candidate found within the image, by either user-guided mode, automatic detection mode, or some combination thereof, subsequent processing will attempt to construct a table in an electronic form that is computer readable. For each of the table candidates, a table can be constructed. The table's construction can start with a base column of the candidate table, such as a first cell in a header for the table. The processing for the table's construction can include column detection, row detection, and then cell population. Those of the table candidates being processed that return a completed table can be scored and filtered down, in order to remove overlaps and duplication from the result set. Finally, the one or more completed tables can be returned to the user in their completed form.

In one embodiment, the column detection processing can be carried as follows. Initially, for the objects that are relevant to the horizontal "row" of the base column (e.g., header row), all objects of interest are combined and sorted by horizontal position (left-to-right) into a single indexable data structure. The resulting indexable data structure (e.g., ordered list) can include object data for those of the objects for which: (i) the locations of control objects that are horizontally aligned with the base column, (ii) the locations of text objects that are horizontally aligned with the base column, and (iii) the locations of vertical lines that are horizontally aligned with the base column. A column processing loop can iterate over the indexable data structure of objects in order to fill out the current column of the particular table being constructed. In one embodiment, the column loop processing can include one more of the following operations. The first unused object can be selected from the indexed data structure and processed. The first unused object can be referred to as the "active entity."

Depending on its type of object, the active entity is processed differently. If the active entity is text, column text matching processing can be performed. The column text matching can assign text to the current column, and may signal the end of the current column. Alternatively, if the active entity is a scrollbar control, the scrollbar control can be assigned to the table being constructed. If the table is a user-defined table and explicitly indicates that this table should contain columns after the scrollbar, the current column can be closed and the table is ended immediately. If the active entity is a non-scrollbar control, the non-scrollbar control can be assigned to the current column. If the active entity is a vertical line, the column processing loop can continue to process a next active entity.

In addition, if the current column has not ended, a second loop can also be used to search forward, past the active entity in the indexed data structure. This later entity will be referred to as the "peek entity." This second loop can operate to search for the end of the current column. In this second loop, the peek entry entity can also be processed differently depending on the type of object.

If the peek entity is a text object, then the second loop processing can operate as follows. If the current column already has text assigned to it, the column can end immediately before the peek entity. If an end divider line has been marked for the current column, the end divider can be used as a snapping point for the current column. Alternatively, if the current column does not have text assigned to it, the column text matching process can be executed. This may assign text to the current column, and may end the column.

On the other hand, if the peek entity is a scrollbar control, then the second loop processing can assign the scrollbar control to the table. If the table recognition is user-guided and explicitly indicated that the table should contain columns after the scrollbar, the current column is closed and the table is ended immediately.

As another alternative, if the peek entity is a non-scrollbar control, then the second loop processing can operate as follows. If the current column already has a control assigned to it, then the column can be ended immediately before the peek entity. If an end divider line has been marked for the current column, the end divider line can be used as a snapping point for the current column. Alternatively, if the current column does not have a control assigned to it, then the non-scrollbar control can be assigned to the current column. As another alternative, if the peek entity is a line, the peek entity can be marked as an end divider line. If multiple consecutive lines are found close to each other, they can be averaged together to determine the center for use as the divider line.

As yet another alternative, when the peek entity does not match any of the above considered object types, then the second loop processing repeats for another peek entity, which continues until the current column eventually ends.

Finally, once a column has been fully populated, all objects that were included within the column (both the active entity and peek entities) have been marked as considered, then a completed column can be stored in the candidate table. The end coordinate of the completed column can be "snapped" to nearby an available vertical line if present. If all of the objects included within the column have not been considered, then the column processing loop continues taking the next object from the indexed data structure as the new active entity, until the table has been finished or no entities remain.

In one embodiment, when a user has provided information some guidance on a table of interest (e.g., user-provided target), the column loop processing can also perform column text matching for potentially improved target construction. For example, if text is found in a column, the text can be compared against the text in a next expected target column from the user-provided target. In one implementation, the comparison can utilize a fuzzy matching algorithm.

The matching can, for example, be performed as follows. If the found text is a good match against the target text, then the found text can be assigned to the current column. If the found text is not a good match with the target text, but is shorter than the target text and a good match against the initial portion of the target text, then found text may be incomplete. The indexed data structure (e.g., entity index) can be scanned forward to locate subsequent pieces of text, which are combined together and compared again. If the combined text scores higher than the originally found text, then the combined text is assigned to the current column instead of the originally found text. On the other hand, if the found text is not a good match, but is longer than the target text, the found text may include text from multiple columns. In this case, the originally found text can be split to match the length of the target text, and then compared again. If the split text scores higher than the original text, then the split portion can be assigned to the current column and the current column is ended. The remaining text after the split can be re-added into the indexed data structure for the next loop to start with.

In one embodiment, following the column detection processing, the row detection processing can be carried as follows. Initially, for the objects that are relevant to the determination of rows can include: (i) the column boundaries from the column detection process; (ii) a text presence mask, such as shown in FIG. 14A, that can be filtered into contiguous blocks of pixel rows that contain significant text, and spacer blocks that do not contain significant text; (iii) a control presence mask, derived from the recognized control objects, such as shown in FIG. 11, that can be filtered into blocks of pixel rows that contain controls; and (iv) the locations of horizontal divider lines within the table region which can be are calculated from the line masks, such as shown in FIG. 13A.

The row detection processing can use contiguous blocks of text to determine the rows. The rows of text are looped through until the table has been ended or no blocks remain. In processing each block of text, the row detection processing checks the size of the active block against a minimum size and a maximum size, and can also be compared to a rolling average of sizes for previous rows (if several have already been found). If the active block is within the size limits, then the active block can be identified as an output row for the table being constructed. If the active block is smaller than the size limits, then the active block can be skipped and the next block is checked. If the active block is larger than the size limits, then the active block might be subdivided. If there are multiple control blocks within the active text block, and the sizes and spacing of those control blocks are within the size limits, then those rows can be identified as an output row for the table being constructed. In such case, the row detection processing is able to detect control-filled rows in tables that do not contain text. However, if there are not enough control blocks within the active text block, the table can end.

When an output row for the table has been identified, the line mask can be searched for nearby divider line(s) to the calculated end point. The row boundaries can be can be aligned (e.g., "snapped") to the identified divider line(s), if present, such as to the center of the appropriate divider line. After the processing of the blocks of text has completed, the identified output rows can be stored to the constructed table.

After establishing the column boundaries and row boundaries, the cells for the constructed table are known and can be populated. In one embodiment, cell population processing can be performed as follows. For each row, a loop processes each of the columns, and then retrieves positionally matching text from the detected text (e.g., FIG. 12) and/or detected controls (e.g., FIG. 11). This can be done using a data structure optimized for coordinate lookups. The matching content can then be added to the cell of the row being processed. The matching content can also be scored such as dependent on whether the content has well-aligned objects or poorly-aligned objects with respect to the cell boundaries. Text that overflows the column boundaries can truncated to the cell area, and can be given a reduced score.

Additionally, after a particular row has been populated with content, the row can be scored. If the content for the row has a poor alignment, the row can be skipped and the particular candidate table ended. Also, if the row has too little content (as compared to other rows of the same table), then the row can be skipped and the particular candidate table ended. If the row is deemed well-aligned, then the row can be added to the table being constructed. Thereafter, a next row can be similarly processed.

The table construction is carried out for the various candidate tables that were identified within the image, such as pertaining to the table 1000 illustrated in FIG. However, this considers any of the candidate tables it finds within the image. As a result, there may be duplicate or overlapping tables within the candidate tables. The constructed tables for the candidate tables can be scored and then filtered down to remove the duplicate or overlapping tables. In the case of user-guided mode, the filtering is able to choose the constructed table that bast matches the user guidance.

The various aspects disclosed herein can be utilized with or by robotic process automation systems. For example, various embodiment of RPA systems can make use of table extraction and/or creation to more accurately or efficiently utilize tables, and data within the tables, that are present within images (e.g., produced by programs), such that automation of business processes involving images of tabular data can be better achieved. Exemplary robotic process automation systems and operations thereof are detailed below.

Figure 16:
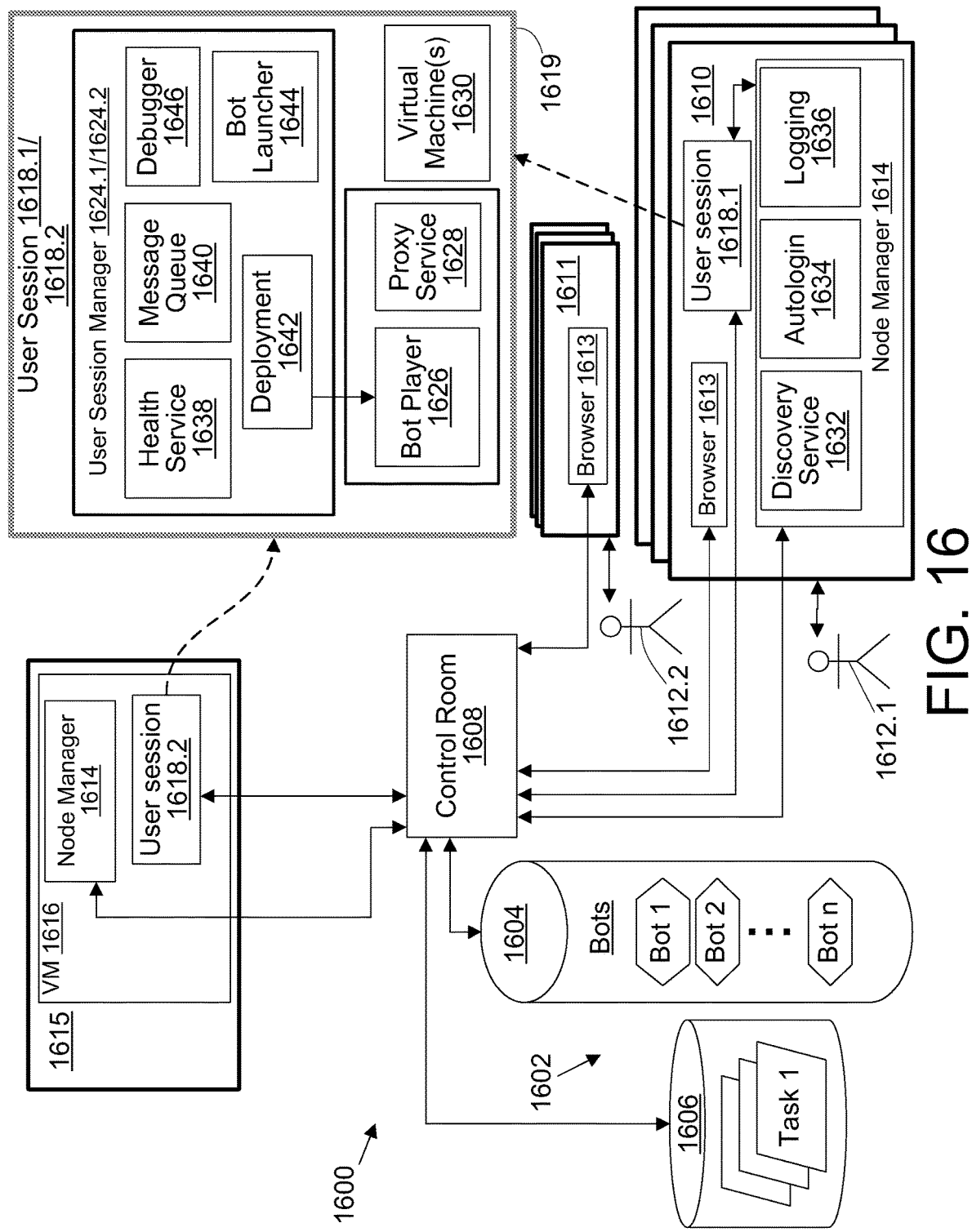
FIG. 16 is a block diagram of an RPA system according to one embodiment.

FIG. 16 is a block diagram of a RPA system 1600 according to one embodiment. The RPA system 1600 includes data storage 1602. The data storage 1602 can store a plurality of software robots 1604, also referred to as bots (e.g., Bot 1, Bot 2, . . . , Bot n, where n is an integer). The software robots 1604 can be operable to interact at a user level with one or more user level application programs (not shown). As used herein, the term "bot" is generally synonymous with the term software robot. In certain contexts, as will be apparent to those skilled in the art in view of the present disclosure, the term "bot runner" refers to a device (virtual or physical), having the necessary software capability (such as bot player 1626), on which a bot will execute or is executing. The data storage 1602 can also stores a plurality of work items 1606. Each work item 1606 can pertain to processing executed by one or more of the software robots 1604.

The RPA system 1600 can also include a control room 1608. The control room 1608 is operatively coupled to the data storage 1602 and is configured to execute instructions that, when executed, cause the RPA system 1600 to respond to a request from a client device 1610 that is issued by a user 1612.1. The control room 1608 can act as a server to provide to the client device 1610 the capability to perform an automation task to process a work item from the plurality of work items 1606. The RPA system 1600 is able to support multiple client devices 1610 concurrently, each of which will have one or more corresponding user session(s) 1618, which provides a context. The context can, for example, include security, permissions, audit trails, etc. to define the permissions and roles for bots operating under the user session 1618. For example, a bot executing under a user session cannot access any files or use any applications that the user, under whose credentials the bot is operating, does not have permission to do so. This prevents any inadvertent or malicious acts from a bot under which bot 1604 executes.

The control room 1608 can provide, to the client device 1610, software code to implement a node manager 1614. The node manager 1614 executes on the client device 1610 and provides a user 1612 a visual interface via browser 1613 to view progress of and to control execution of automation tasks. It should be noted that the node manager 1614 can be provided to the client device 1610 on demand, when required by the client device 1610, to execute a desired automation task. In one embodiment, the node manager 1614 may remain on the client device 1610 after completion of the requested automation task to avoid the need to download it again. In another embodiment, the node manager 1614 may be deleted from the client device 1610 after completion of the requested automation task. The node manager 1614 can also maintain a connection to the control room 1608 to inform the control room 1608 that device 1610 is available for service by the control room 1608, irrespective of whether a live user session 1618 exists. When executing a bot 1604, the node manager 1614 can impersonate the user 1612 by employing credentials associated with the user 1612.

The control room 1608 initiates, on the client device 1610, a user session 1618 (seen as a specific instantiation 1618.1) to perform the automation task. The control room 1608 retrieves the set of task processing instructions 1604 that correspond to the work item 1606. The task processing instructions 1604 that correspond to the work item 1606 can execute under control of the user session 1618.1, on the client device 1610. The node manager 1614 can provide update data indicative of status of processing of the work item to the control room 1608. The control room 1608 can terminate the user session 1618.1 upon completion of processing of the work item 1606. The user session 1618.1 is shown in further detail at 1619, where an instance 1624.1 of user session manager 1624 is seen along with a bot player 1626, proxy service 1628, and one or more virtual machine(s) 1630, such as a virtual machine that runs Java® or Python®. The user session manager 1624 provides a generic user session context within which a bot 1604 executes.

The bots 1604 execute on a bot player, via a computing device, to perform the functions encoded by the bot. Some or all of the bots 1604 may, in certain embodiments, be located remotely from the control room 1608. Moreover, the devices 1610 and 1611, which may be conventional computing devices, such as for example, personal computers, server computers, laptops, tablets and other portable computing devices, may also be located remotely from the control room 1608. The devices 1610 and 1611 may also take the form of virtual computing devices. The bots 1604 and the work items 1606 are shown in separate containers for purposes of illustration but they may be stored in separate or the same device(s), or across multiple devices. The control room 1608 can perform user management functions, source control of the bots 1604, along with providing a dashboard that provides analytics and results of the bots 1604, performs license management of software required by the bots 1604 and manages overall execution and management of scripts, clients, roles, credentials, security, etc. The major functions performed by the control room 1608 can include: (i) a dashboard that provides a summary of registered/active users, tasks status, repository details, number of clients connected, number of scripts passed or failed recently, tasks that are scheduled to be executed and those that are in progress, and any other desired information; (ii) user/role management—permits creation of different roles, such as bot creator, bot runner, admin, and custom roles, and activation, deactivation and modification of roles; (iii) repository management—to manage all scripts, tasks, workflows and reports etc.; (iv) operations management—permits checking status of tasks in progress and history of all tasks, and permits the administrator to stop/start execution of bots currently executing; (v) audit trail—logs creation of all actions performed in the control room; (vi) task scheduler—permits scheduling tasks which need to be executed on different clients at any particular time; (vii) credential management—permits password management; and (viii) security: management— permits rights management for all user roles. The control room 1608 is shown generally for simplicity of explanation. Multiple instances of the control room 1608 may be employed where large numbers of bots are deployed to provide for scalability of the RPA system 1600.

In the event that a device, such as device 1611 (e.g., operated by user 1612.2) does not satisfy the minimum processing capability to run a node manager 1614, the control room 1608 can make use of another device, such as device 1615, that has the requisite capability. In such case, a node manager 1614 within a Virtual Machine (VM), seen as VM 1616, can be resident on the device 1615. The node manager 1614 operating on the device 1615 can communicate with browser 1613 on device 1611. This approach permits RPA system 1600 to operate with devices that may have lower processing capability, such as older laptops, desktops, and portable/mobile devices such as tablets and mobile phones. In certain embodiments the browser 1613 may take the form of a mobile application stored on the device 1611. The control room 1608 can establish a user session 1618.2 for the user 1612.2 while interacting with the control room 1608 and the corresponding user session 1618.2 operates as described above for user session 1618.1 with user session manager 1624 operating on device 1610 as discussed above.

In certain embodiments, the user session manager 1624 can provide five functions. First is a health service 1638 that maintains and provides a detailed logging of bot execution including monitoring memory and CPU usage by the bot and other parameters such as number of file handles employed. The bots 1604 can employ the health service 1638 as a resource to pass logging information to the control room

1608. Execution of the bot is separately monitored by the user session manager 1624 to track memory, CPU, and other system information. The second function provided by the user session manager 1624 is a message queue 1640 for exchange of data between bots executed within the same user session 1618. The third function is a deployment service (also referred to as a deployment module) 1642 that connects to the control room 1608 to request execution of a requested bot 1604. The deployment service 1642 can also ensure that the environment is ready for bot execution, such as by making available dependent libraries. The fourth function is a bot launcher 1644 which can read metadata associated with a requested bot 1604 and launch an appropriate container and begin execution of the requested bot. The fifth function is a debugger service 1646 that can be used to debug bot code.

The bot player 1626 can execute, or play back, a sequence of instructions encoded in a bot. The sequence of instructions can, for example, be captured by way of a recorder when a human performs those actions, or alternatively the instructions are explicitly coded into the bot. These instructions enable the bot player 1626, to perform the same actions as a human would do in their absence. In one implementation, the instructions can compose of a command (or action) followed by set of parameters. For example, "Open Browser" is a command and a URL would be the parameter for it to launch a web resource. Proxy service 1628 can enable integration of external software or applications with the bot to provide specialized services. For example, an externally hosted artificial intelligence system can enable the bot to understand the meaning of a "sentence."

The user 1612.1 can interact with node manager 1614 via a conventional browser 1613 which employs the node manager 1614 to communicate with the control room 1608. When the user 1612.1 logs in from the client device 1610 to the control room 1608 for the first time, the user 1612.1 can be prompted to download and install the node manager 1614 on the device 1610, if one is not already present. The node manager 1614 can establish a web socket connection to the user session manager 1624, deployed by the control room 1608 that lets the user 1612.1 subsequently create, edit, and deploy the bots 1604.

Figure 17:
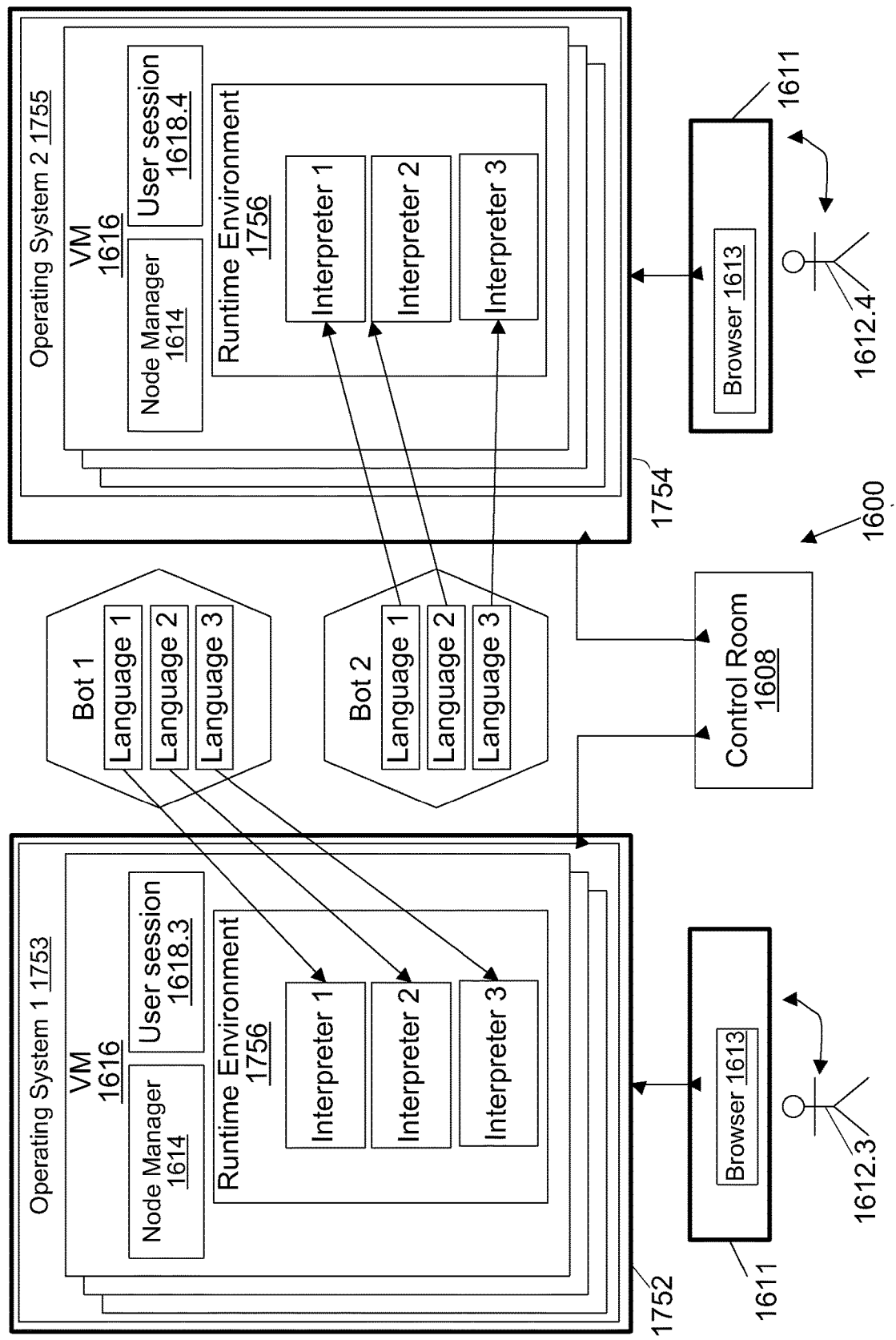
FIG. 17 is a block diagram of a generalized runtime environment for software robots (e.g., bots) in accordance with another embodiment of the RPA system illustrated in FIG. 16.

FIG. 17 is a block diagram of a generalized runtime environment for bots 1604 in accordance with another embodiment of the RPA system 1600 illustrated in FIG. 16. This flexible runtime environment advantageously permits extensibility of the platform to enable use of various languages in encoding bots. In the embodiment of FIG. 17, RPA system 1600 generally operates in the manner described in connection with FIG. 16, except that in the embodiment of FIG. 17, some or all of the user sessions 1618 execute within a virtual machine 1616. This permits the bots 1604 to operate on an RPA system 1600 that runs on an operating system different from an operating system on which a bot 1604 may have been developed. For example, if a bot 1604 is developed on the Windows® operating system, the platform agnostic embodiment shown in FIG. 17 permits the bot 1604 to be executed on a device 1752 or 1754 executing an operating system 1753 or 1755 different than Windows®, such as, for example, Linux. In one embodiment, the VM 1616 takes the form of a Java Virtual Machine (JVM) as provided by Oracle Corporation. As will be understood by those skilled in the art in view of the present disclosure, a JVM enables a computer to run Java® programs as well as programs written in other languages that are also compiled to Java® bytecode.

In the embodiment shown in FIG. 17, multiple devices 1752 can execute operating system 1, 1753, which may, for example, be a Windows® operating system. Multiple devices 1754 can execute operating system 2, 1755, which may, for example, be a Linux® operating system. For simplicity of explanation, two different operating systems are shown, by way of example and additional operating systems such as the macOS®, or other operating systems may also be employed on devices 1752, 1754 or other devices. Each device 1752, 1754 has installed therein one or more VM's 1616, each of which can execute its own operating system (not shown), which may be the same or different than the host operating system 1753/1755. Each VM 1616 has installed, either in advance, or on demand from control room 1608, a node manager 1614. The embodiment illustrated in FIG. 17 differs from the embodiment shown in FIG. 16 in that the devices 1752 and 1754 have installed thereon one or more VMs 1616 as described above, with each VM 1616 having an operating system installed that may or may not be compatible with an operating system required by an automation task. Moreover, each VM has installed thereon a runtime environment 1756, each of which has installed thereon one or more interpreters (shown as interpreter 1, interpreter 2, interpreter 3). Three interpreters are shown by way of example but any run time environment 1756 may, at any given time, have installed thereupon less than or more than three different interpreters. Each interpreter 1756 is specifically encoded to interpret instructions encoded in a particular programming language. For example, interpreter 1 may be encoded to interpret software programs encoded in the Java® programming language, seen in FIG. 17 as language 1 in Bot 1 and Bot 2. Interpreter 2 may be encoded to interpret software programs encoded in the Python® programming language, seen in FIG. 17 as language 2 in Bot 1 and Bot 2, and interpreter 3 may be encoded to interpret software programs encoded in the R programming language, seen in FIG. 17 as language 3 in Bot 1 and Bot 2.

Turning to the bots Bot 1 and Bot 2, each bot may contain instructions encoded in one or more programming languages. In the example shown in FIG. 17, each bot can contain instructions in three different programming languages, for example, Java®, Python® and R. This is for purposes of explanation and the embodiment of FIG. 17 may be able to create and execute bots encoded in more or less than three programming languages. The VMs 1616 and the runtime environments 1756 permit execution of bots encoded in multiple languages, thereby permitting greater flexibility in encoding bots. Moreover, the VMs 1616 permit greater flexibility in bot execution. For example, a bot that is encoded with commands that are specific to an operating system, for example, open a file, or that requires an application that runs on a particular operating system, for example, Excel® on Windows®, can be deployed with much greater flexibility. In such a situation, the control room 1608 will select a device with a VM 1616 that has the Windows® operating system and the Excel® application installed thereon. Licensing fees can also be reduced by serially using a particular device with the required licensed operating system and application(s), instead of having multiple devices with such an operating system and applications, which may be unused for large periods of time.

Figure 18:
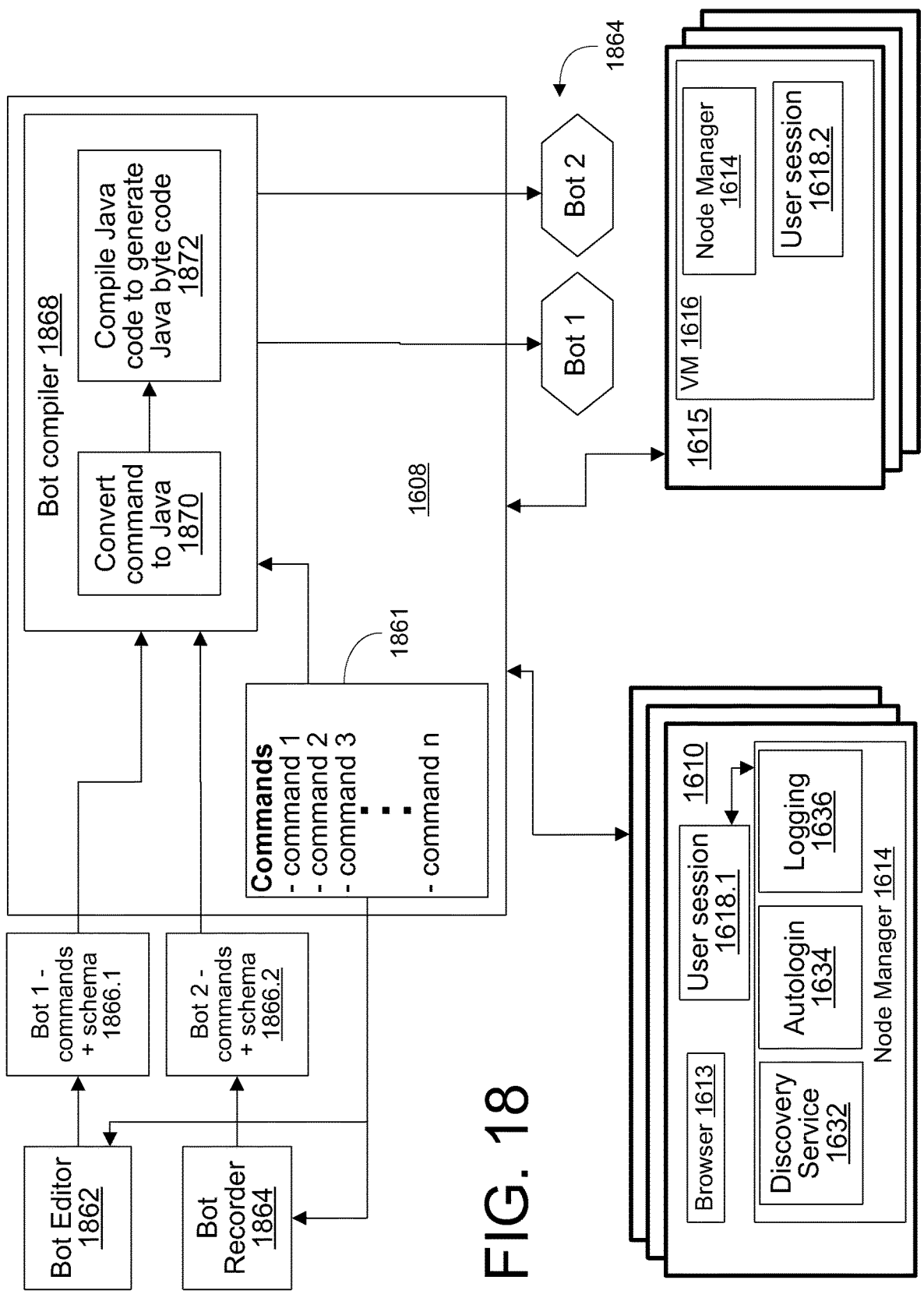
FIG. 18 illustrates yet another embodiment of the RPA system of FIG. 16 configured to provide platform independent sets of task processing instructions for software robots.

FIG. 18 illustrates a block diagram of yet another embodiment of the RPA system 1600 of FIG. 16 configured to provide platform independent sets of task processing instructions for bots 1604. Two bots 1604, bot 1 and bot 2 are shown in FIG. 18. Each of bots 1 and 2 are formed from one or more commands 1801, each of which specifies a user level operation with a specified application program, or a user level operation provided by an operating system. Sets of commands 1806.1 and 1806.2 may be generated by bot editor 1802 and bot recorder 1804, respectively, to define sequences of application-level operations that are normally performed by a human user. The bot editor 1802 may be configured to combine sequences of commands 1801 via an editor. The bot recorder 1804 may be configured to record application-level operations performed by a user and to convert the operations performed by the user to commands 1801. The sets of commands 1806.1 and 1806.2 generated by the editor 1802 and the recorder 1804 can include command(s) and schema for the command(s), where the schema defines the format of the command(s). The format of a command can include the input(s) expected by the command and their format. For example, a command to open a URL might include the URL, a user login, and a password to login to an application resident at the designated URL.

The control room 1608 operates to compile, via compiler 1808, the sets of commands generated by the editor 1802 or the recorder 1804 into platform independent executables, each of which is also referred to herein as a bot JAR (Java ARchive) that perform application-level operations captured by the bot editor 1802 and the bot recorder 1804. In the embodiment illustrated in FIG. 18, the set of commands 1806, representing a bot file, can be captured in a JSON (JavaScript Object Notation) format which is a lightweight data-interchange text-based format. JSON is based on a subset of the JavaScript Programming Language Standard ECMA-262 3rd Edition—December 1999. JSON is built on two structures: (i) a collection of name/value pairs; in various languages, that can be realized as an object, record, struct, dictionary, hash table, keyed list, or associative array, (ii) an ordered list of values which, in most languages, is realized as an array, vector, list, or sequence. Bots 1 and 2 may be executed on devices 1610 and/or 1615 to perform the encoded application-level operations that are normally performed by a human user.

Figure 19:
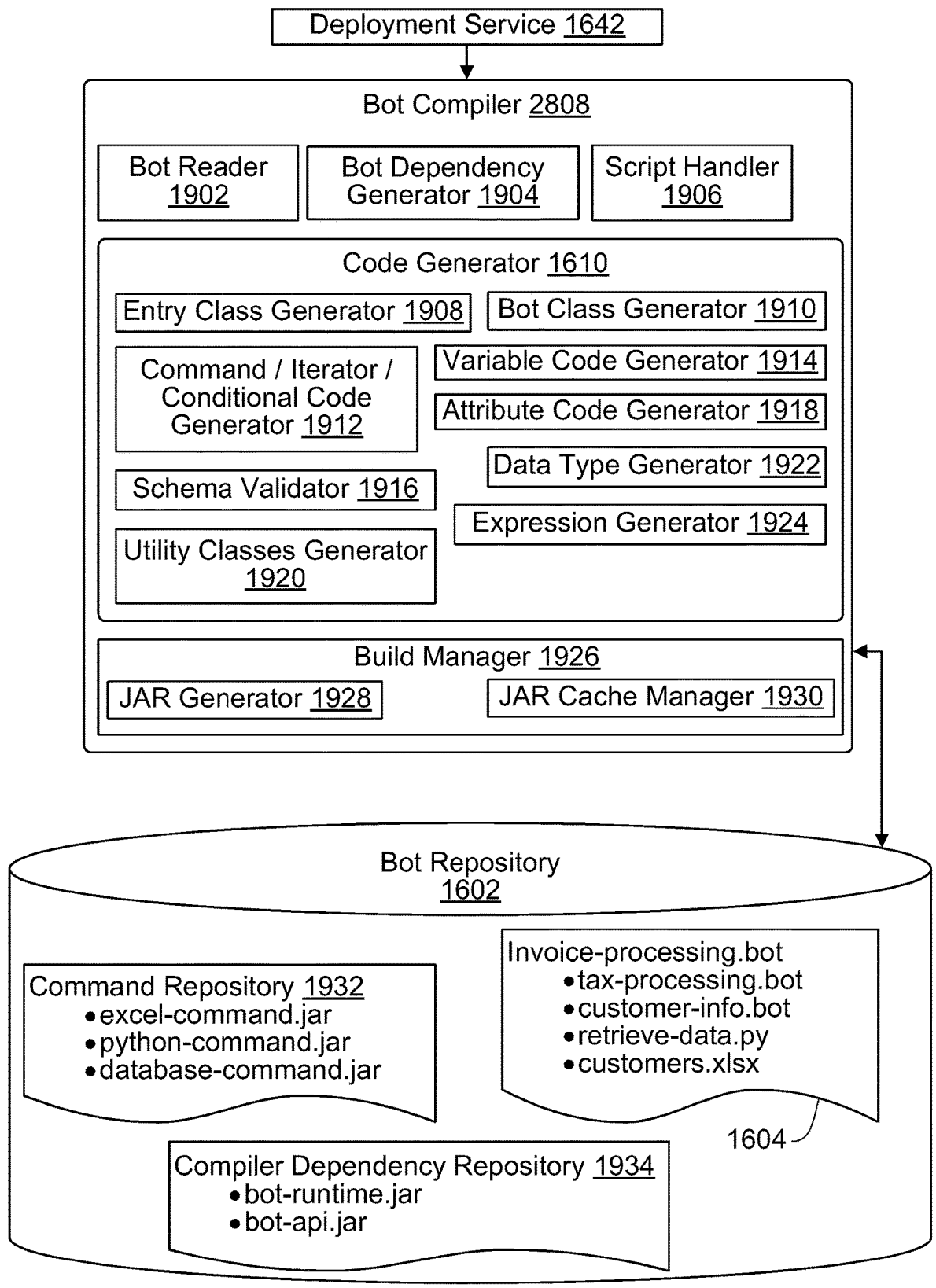
FIG. 19 is a block diagram illustrating details of one embodiment of bot compiler illustrated in FIG. 18.

FIG. 19 is a block diagram illustrating details of one embodiment of the bot compiler 1808 illustrated in FIG. 18. The bot compiler 1808 accesses one or more of the bots 1604 from the data storage 1602, which can serve as bot repository, along with commands 1801 that are contained in a command repository 1932. The bot compiler 1608 can also access compiler dependency repository 1934. The bot compiler 1608 can operate to convert each command 1801 via code generator module 1810 to an operating system independent format, such as a Java command. The bot compiler 1608 then compiles each operating system independent format command into byte code, such as Java byte code, to create a bot JAR. The convert command to Java module 1810 is shown in further detail in in FIG. 19 by JAR generator 1928 of a build manager 1926. The compiling to generate Java byte code module 1812 can be provided by the JAR generator 1928. In one embodiment, a conventional Java compiler, such as javac from Oracle Corporation, may be employed to generate the bot JAR (artifacts). As will be appreciated by those skilled in the art, an artifact in a Java environment includes compiled code along with other dependencies and resources required by the compiled code. Such dependencies can include libraries specified in the code and other artifacts. Resources can include web pages, images, descriptor files, other files, directories and archives.

As noted in connection with FIG. 18, deployment service 1642 can be responsible to trigger the process of bot compilation and then once a bot has compiled successfully, to execute the resulting bot JAR on selected devices 1610 and/or 1615. The bot compiler 1808 can comprises a number of functional modules that, when combined, generate a bot 1604 in a JAR format. A bot reader 1902 loads a bot file into memory with class representation. The bot reader 1902 takes as input a bot file and generates an in-memory bot structure. A bot dependency generator 1904 identifies and creates a dependency graph for a given bot. It includes any child bot, resource file like script, and document or image used while creating a bot. The bot dependency generator 1904 takes, as input, the output of the bot reader 1902 and provides, as output, a list of direct and transitive bot dependencies. A script handler 1906 handles script execution by injecting a contract into a user script file. The script handler 1906 registers an external script in manifest and bundles the script as a resource in an output JAR. The script handler 1906 takes, as input, the output of the bot reader 1902 and provides, as output, a list of function pointers to execute different types of identified scripts like Python, Java, or VB scripts.

An entry class generator 1908 can create a Java class with an entry method, to permit bot execution to be started from that point. For example, the entry class generator 1908 takes, as an input, a parent bot name, such "Invoice-processing-.bot" and generates a Java class having a contract method with a predefined signature. A bot class generator 1910 can generate a bot class and orders command code in sequence of execution. The bot class generator 1910 can take, as input, an in-memory bot structure and generates, as output, a Java class in a predefined structure. A Command/Iterator/Conditional Code Generator 1912 wires up a command class with singleton object creation, manages nested command linking, iterator (loop) generation, and conditional (If/Else If/Else) construct generation. The Command/Iterator/Conditional Code Generator 1912 can take, as input, an in-memory bot structure in JSON format and generates Java code within the bot class. A variable code generator 1914 generates code for user defined variables in the bot, maps bot level data types to Java language compatible types, and assigns initial values provided by user. The variable code generator 1914 takes, as input, an in-memory bot structure and generates Java code within the bot class. A schema validator 1916 can validate user inputs based on command schema and includes syntax and semantic checks on user provided values. The schema validator 1916 can take, as input, an in-memory bot structure and generates validation errors that it detects. The attribute code generator 1918 can generate attribute code, handles the nested nature of attributes, and transforms bot value types to Java language compatible types. The attribute code generator 1918 takes, as input, an in-memory bot structure and generates Java code within the bot class. A utility classes generator 1920 can generate utility classes which are used by an entry class or bot class methods. The utility classes generator 1920 can generate, as output, Java classes. A data type generator 1922 can generate value types useful at runtime. The data type generator 1922 can generate, as output, Java classes. An expression generator 1924 can evaluate user inputs and generates compatible Java code, identifies complex variable mixed user inputs, inject variable values, and transform mathematical expressions. The expression generator 1924 can take, as input, user defined values and generates, as output, Java compatible expressions.

The JAR generator 1928 can compile Java source files, produces byte code and packs everything in a single JAR, including other child bots and file dependencies. The JAR generator 1928 can take, as input, generated Java files, resource files used during the bot creation, bot compiler dependencies, and command packages, and then can generate a JAR artifact as an output. The JAR cache manager 1930 can put a bot JAR in cache repository so that recompilation can be avoided if the bot has not been modified since the last cache entry. The JAR cache manager 1930 can take, as input, a bot JAR.

In one or more embodiments described herein, command action logic can be implemented by commands 1801 available at the control room 1608. This permits the execution environment on a device 1610 and/or 1615, such as exists in a user session 1618, to be agnostic to changes in the command action logic implemented by a bot 1604. In other words, the manner in which a command implemented by a bot 1604 operates need not be visible to the execution environment in which a bot 1604 operates. The execution environment is able to be independent of the command action logic of any commands implemented by bots 1604. The result is that changes in any commands 1801 supported by the RPA system 1600, or addition of new commands 1801 to the RPA system 1600, do not require an update of the execution environment on devices 1610, 1615. This avoids what can be a time and resource intensive process in which addition of a new command 1801 or change to any command 1801 requires an update to the execution environment to each device 1610, 1615 employed in an RPA system. Take, for example, a bot that employs a command 1801 that logs into an on-online service. The command 1801 upon execution takes a Uniform Resource Locator (URL), opens (or selects) a browser, retrieves credentials corresponding to a user on behalf of whom the bot is logging in as, and enters the user credentials (e.g., username and password) as specified. If the command 1801 is changed, for example, to perform two-factor authentication, then it will require an additional resource (the second factor for authentication) and will perform additional actions beyond those performed by the original command (for example, logging into an email account to retrieve the second factor and entering the second factor). The command action logic will have changed as the bot is required to perform the additional changes. Any bot(s) that employ the changed command will need to be recompiled to generate a new bot JAR for each changed bot and the new bot JAR will need to be provided to a bot runner upon request by the bot runner. The execution environment on the device that is requesting the updated bot will not need to be updated as the command action logic of the changed command is reflected in the new bot JAR containing the byte code to be executed by the execution environment.

The embodiments herein can be implemented in the general context of computer-executable instructions, such as those included in program modules, being executed in a computing system on a target, real or virtual, processor. Generally, program modules include routines, programs, libraries, objects, classes, components, data structures, etc. that perform particular tasks or implement particular abstract data types. The program modules may be obtained from another computer system, such as via the Internet, by downloading the program modules from the other computer system for execution on one or more different computer systems. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may further include a device or product having content stored thereon at a time of sale or delivery. Thus, delivering a device with stored content, or offering content for download over a communication medium, may be understood as providing an article of manufacture with such content described herein.

Figure 20:
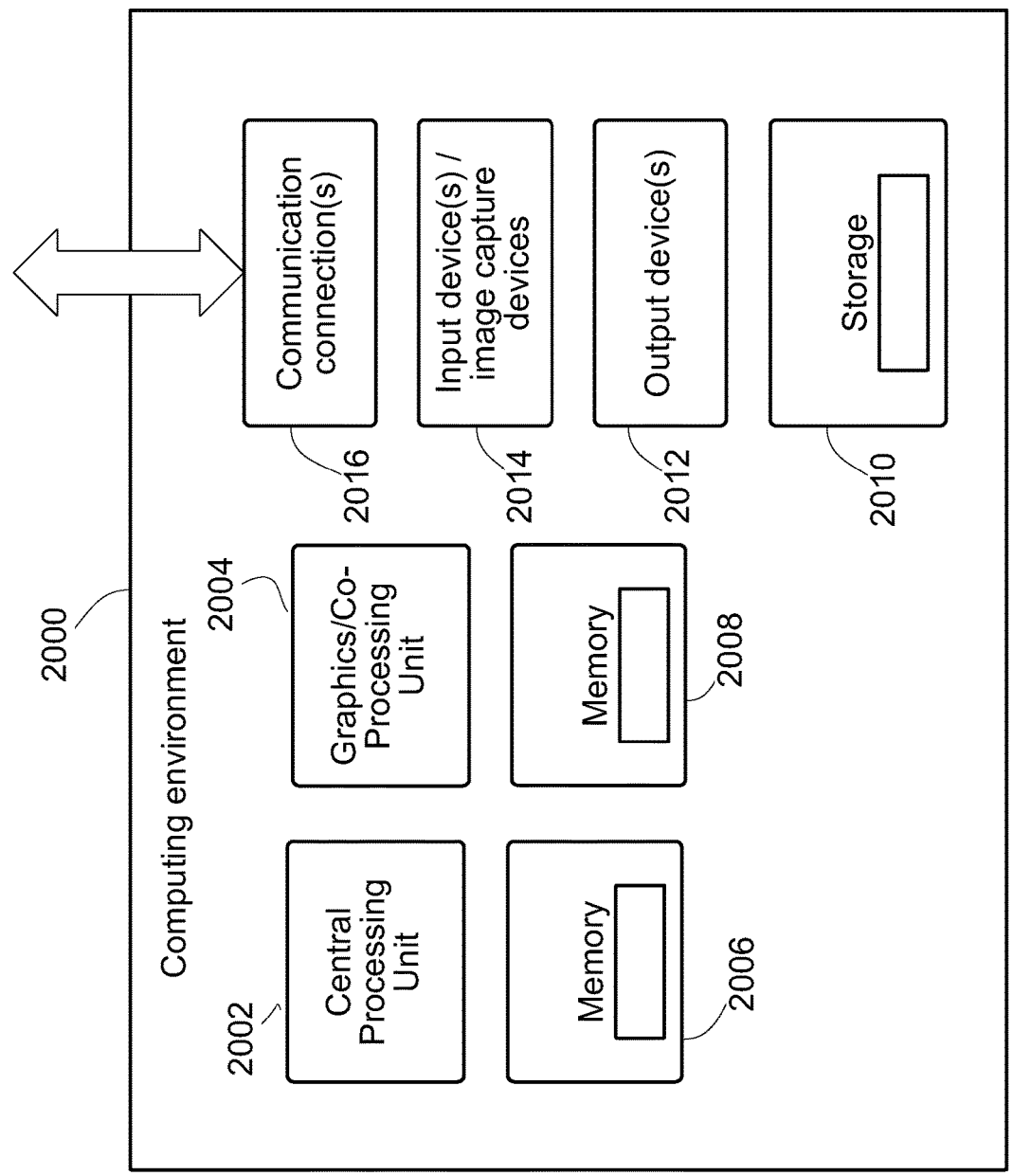
FIG. 20 illustrates a block diagram of an exemplary computing environment for an implementation of an RPA system, such as the RPA systems disclosed herein.

FIG. 20 illustrates a block diagram of an exemplary computing environment 2000 for an implementation of an RPA system, such as the RPA systems disclosed herein. The embodiments described herein may be implemented using the exemplary computing environment 2000. The exemplary computing environment 2000 includes one or more processing units 2002, 2004 and memory 2006, 2008. The processing units 2002, 2004 execute computer-executable instructions. Each of the processing units 2002, 2004 can be a general-purpose central processing unit (CPU), processor in an application-specific integrated circuit (ASIC) or any other type of processor. For example, as shown in FIG. 20, the processing unit 2002 can be a CPU, and the processing unit 2004 can be a graphics/co-processing unit (GPU). The tangible memory 2006, 2008 may be volatile memory (e.g., registers, cache, RAM), non-volatile memory (e.g., ROM, EEPROM, flash memory, etc.), or some combination of the two, accessible by the processing unit(s). The hardware components may be standard hardware components, or alternatively, some embodiments may employ specialized hardware components to further increase the operating efficiency and speed with which the RPA system operates. The various components of exemplary computing environment 2000 may be rearranged in various embodiments, and some embodiments may not require nor include all of the above components, while other embodiments may include additional components, such as specialized processors and additional memory.

The exemplary computing environment 2000 may have additional features such as, for example, tangible storage 2010, one or more input devices 2014, one or more output devices 2012, and one or more communication connections 2016. An interconnection mechanism (not shown) such as a bus, controller, or network can interconnect the various components of the exemplary computing environment 2000. Typically, operating system software (not shown) provides an operating system for other software executing in the exemplary computing environment 2000, and coordinates activities of the various components of the exemplary computing environment 2000.

The tangible storage 2010 may be removable or non-removable, and includes magnetic disks, magnetic tapes or cassettes, CD-ROMs, DVDs, or any other medium which can be used to store information in a non-transitory way, and which can be accessed within the computing system 2000. The tangible storage 2010 can store instructions (i.e., computer program code) for the software implementing one or more features of an RPA system as described herein.

The input device(s) or image capture device(s) 2014 may include, for example, one or more of: a touch input device, such as a keyboard, mouse, pen, or trackball, a voice input device, a scanning device, an imaging sensor, a touch surface, or any other device capable of providing input to the exemplary computing environment 2000. For multimedia embodiment, the input device(s) 2014 can, for example, include a camera, a video card, a TV tuner card, or similar device that accepts video input in analog or digital form, a microphone, an audio card, or a CD-ROM or CD-RW that reads audio/video samples into the exemplary computing environment 2000. The output device(s) 2012 can, for example, include a display, a printer, a speaker, a CD-writer, or any another device that provides output from the exemplary computing environment 2000.

The one or more communication connections 2016 can enable communication over a communication medium to another computing entity. The communication medium conveys information such as computer-executable instructions, audio or video input or output, or other data. The communication medium can include a wireless medium, a wired medium, or a combination thereof.

This application incorporates by reference herein U.S. Provisional Patent Application No. 63/355,091, filed Jun. 23, 2022, and entitled "COMPUTERIZED RECOGNITION OF TABULAR DATA FROM AN IMAGE," including its appendix, for any additional disclosure therein.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. In one embodiment, the computer readable medium is non-transitory. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method for constructing an electronic table representing a table contained within an image, the method comprising:
    receiving an image including the table, the image being a screen image from a display associated with a computing device;
    processing the image to capture object data from the image, the object data pertaining to objects within the image, the objects within the image include at least control objects, text objects and line objects, wherein the object data for a control object includes control object data, the object data for a text object includes text object data, and the object data for a line object includes line object data;
    determining columns and rows for the table contained within the image based on at least a portion of the captured object data from the image;
    identifying content for cells within the table contained within the image based on at least a portion of the captured object data from the image; and
    storing electronic data to a table data structure such that the electronic data is stored to one or more of the cells of the table data structure, the electronic data being stored to the table data structure being determined at least in part by the captured object data from the image,
    wherein the determining of the columns for the table contained within the image comprises:
        identifying a header region for the table within the image using an image mask; and
        detecting the columns for the table based on the captured object data for a plurality of the objects that are positionally within the header region.

2. A computer-implemented method as recited in claim 1, wherein the screen image is presented on the display by an application program operating on the computing device.

3. A computer-implemented method as recited in claim 1, wherein the image includes at least an image of an electronic window that includes at least the table.

4. A computer-implemented method as recited in claim 1, wherein the line objects are determined from a masking process that evaluates the image for lines.

5. A computer-implemented method as recited in claim 1, wherein the determining of the columns for the table contained within the image comprises:
    evaluating the line objects to locate at least one candidate table position or region within the image; and
    determining at least one column for the table based on the at least one candidate table position or region within the image.

6. A computer-implemented method as recited in claim 1, wherein the at least one position or region within the image pertains to a corner of the table within the image, and
    wherein the determining of the at least one column for the table operates to determine at least a first column for the table.

7. A computer-implemented method as recited in claim 1, wherein the determining of the columns for the table contained within the image comprises:
    identifying, from the captured object data, text, controls and/or slider bars within the header region for the table; and detecting the columns for the table based on the text, controls, and/or slider bars within the header region for the table.

8. A computer-implemented method as recited in claim 1, wherein the detecting the columns evaluates the plurality of objects in a positional order left-to-right in order to determine column boundaries.

9. A computer-implemented method as recited in claim 8, wherein the evaluation of each of the objects is dependent on the type of the object.

10. A computer-implemented method as recited in claim 8, wherein the determining of the columns for the table contained within the image comprises:
   processing a current object from the plurality of objects, looking ahead to a next object from the plurality of objects; and
   influencing the determining of the columns for the table based on the current object and the next object.

11. A computer-implemented method as recited in claim 8, wherein the determining of the columns for the table contained within the image comprises:
   considering a series of the objects from the plurality of objects to classify a current object of the plurality of objects as part of a current column or not.

12. A computer-implemented method as recited in claim 11, wherein the classification for the current object is based at least in part on an object type for at least one of the objects in the series of objects.

13. A computer-implemented method as recited in claim 1, wherein the determining of the rows for the table contained within the image comprises:
   identifying text blocks that are substantially positioned in rows within the image; and
   examining the identified text blocks to determine the row boundary positions for the rows.

14. A computer-implemented method as recited in claim 13, wherein the determining of the rows for the table contained within the image comprises:
   identifying horizontal divider lines from a masking process; and
   adjusting the determined row boundary positions based on the corresponding identified horizontal divider lines.

15. A computer-implemented method as recited in claim 1, wherein the method comprises:
   placing at least a portion of the captured object data into an ordered list ordered by position within the image.

16. A non-transitory computer readable medium including at least computer program code tangibly stored therein for constructing an electronic table representing a table contained within an image, the computer readable medium comprising:
   computer program code for receiving an image including the table, the image being a screen image from a display associated with a computing device;
   computer program code for processing the image to capture object data from the image, the object data pertaining to objects within the image, the objects within the image include at least control objects, text objects and line objects, wherein the object data for a control object includes control object data, the object data for a text object includes text object data, and the object data for a line object includes line object data;
   computer program code for determining columns and rows for the table contained within the image based on at least a portion of the captured object data from the image;
   computer program code for identifying content for cells within the table contained within the image based on at least a portion of the captured object data from the image; and
   computer program code for storing electronic data to the electronic table such that the electronic data is stored to one or more of the cells of the electronic table, the electronic data being stored to the electronic table being determined at least in part by the captured object data from the image,
   wherein the computer program code for determining of the columns for the table contained within the image comprises:
      computer program code for identifying a header region for the table within the image; and
      computer program code for detecting the columns for the table based on the captured object data for a plurality of the objects that are positionally within the header region.

17. A computer readable medium as recited in claim 16, wherein the image is a screen image is presented on the display by an application program operating on the computing device, and wherein the screen image includes at least an image of a screen window that includes at least the table.

18. A computer readable medium as recited in claim 16, wherein the line objects are determined from a masking process that evaluates the image for lines.

19. A computer readable medium as recited in claim 18, wherein the computer program code for determining of the columns for the table contained within the image comprises:
   computer program code for evaluating the line objects to locate at least one position or region with the image that might be a table;
   computer program code for determining at least one column for the table based on the at least one position or region within the image that might be a table.

20. A computer readable medium as recited in claim 16, wherein the at least one position or region within the image pertains to a corner of the table within the image, and
   wherein the computer program code for determining of the at least one column for the table operates to determine at least a first column for the table.

21. A computer readable medium as recited in claim 16, wherein the computer program code for determining of the columns for the table contained within the image comprises:
   computer program code for identifying, from the captured object data, text, controls and/or slider bars within the header region for the table; and
   computer program code for detecting the columns for the table based on the text, controls, and/or slider bars within the header region for the table.

22. A computer readable medium as recited in claim 16, wherein the computer program code for detecting the columns evaluates the plurality of objects in a positional order left-to-right in order to determine column boundaries.

23. A computer readable medium as recited in claim 16, wherein the evaluation of each of the objects is dependent on the type of the object.

24. A computer readable medium as recited in claim 16, wherein the computer program code for determining of the columns for the table contained within the image comprises:
   in processing a current object from the plurality of objects, computer program code for looking ahead to a next object from the plurality of objects; and computer program code for influencing the determining of the columns for the table based on the current object and the next object.

25. A computer readable medium as recited in claim 16, wherein the computer program code for determining of the columns for the table contained within the image comprises:
   computer program code for considering a series of the objects from the plurality of objects to classify a current object of the plurality of objects as part of a current column or not.

26. A computer readable medium as recited in claim 16, wherein the computer program code for determining of the rows for the table contained within the image comprises:
   computer program code for identifying text blocks that are substantially positioned in rows within the image; and
   computer program code for examining the identified text blocks to determine the row boundary positions for the rows.

27. A computer readable medium as recited in claim 26, wherein the computer program code for determining of the rows for the table contained within the image comprises:
   computer program code for identifying horizontal divider lines from a masking process; and
   computer program code for adjusting the determined row boundary positions based on the corresponding identified horizontal divider lines.

28. A computer readable medium as recited in claim 16, wherein the computer readable medium comprises:
   computer program code for placing at least a portion of the captured object data into an ordered list ordered by position within the image.

29. A computer readable medium as recited in claim 16, wherein, for each of the objects, the object data being captured therefor depends on a type of the object.

30. A robotic process automation system, comprising:
   a data store configured to store a plurality of software robots, the software robots providing automated interaction with one or more software programs operating on one or more computing devices; and
   a table extraction and construction manager configured to
      receive an image including a table;
      process the image to capture object data from the image;
      determine columns and rows for the table contained within the image based on at least a portion of the captured object data from the image;
      identify content for cells within the table contained within the image based on at least a portion of the captured object data from the image; and
      store electronic data descriptive of the table to the data store, the descriptive data including at least data identifying (i) column and row boundaries for the table, which define cells of the table, and (ii) data identifying content for the cells of the table,
   wherein the determination of the columns for the table contained within the image comprises:
      identify a header region for the table within the image using an image mask; and
      detect the columns for the table based on the captured object data for a plurality of the objects that are positionally within the header region.

* * * * *